(12) United States Patent
Krizmanich et al.

(10) Patent No.: US 9,633,333 B2
(45) Date of Patent: Apr. 25, 2017

(54) SYSTEM FOR DYNAMIC DATA GATHERING AND ANALYSIS

(75) Inventors: Debora Ann Krizmanich, Stratford (CA); Daniel Heinz Erdelt, Stratford (CA)

(73) Assignee: POWERNOODLE INC., Stratford (CA)

( * ) Notice: Subject to any disclaimer, the term of this patent is extended or adjusted under 35 U.S.C. 154(b) by 240 days.

(21) Appl. No.: 13/361,606

(22) Filed: Jan. 30, 2012

(65) Prior Publication Data

US 2013/0198259 A1 Aug. 1, 2013

(51) Int. Cl.
- *G06Q 10/10* (2012.01)
- *G06F 7/00* (2006.01)
- *G06F 15/16* (2006.01)
- *G06F 17/30* (2006.01)

(52) U.S. Cl.
CPC ............. *G06Q 10/10* (2013.01); *G06F 7/00* (2013.01); *G06F 15/16* (2013.01); *G06F 17/30* (2013.01)

(58) Field of Classification Search
CPC combination set(s) only.
See application file for complete search history.

(56) References Cited

U.S. PATENT DOCUMENTS

| | | | |
|---|---|---|---|
| 6,980,983 B2 * | 12/2005 | Banerjee et al. | |
| 7,664,750 B2 | 2/2010 | Frees et al. | |
| 7,730,030 B1 * | 6/2010 | Xu | 707/617 |
| 8,224,816 B2 * | 7/2012 | O'Malley | 707/732 |
| 8,281,248 B2 * | 10/2012 | Kurpick et al. | 715/753 |
| 2003/0046576 A1 * | 3/2003 | High et al. | 713/200 |
| 2004/0068514 A1 * | 4/2004 | Chundi et al. | 707/102 |
| 2005/0086230 A1 * | 4/2005 | Frees et al. | 707/10 |
| 2007/0094601 A1 * | 4/2007 | Greenberg et al. | 715/713 |
| 2007/0250791 A1 * | 10/2007 | Halliday et al. | 715/808 |
| 2008/0004035 A1 * | 1/2008 | Atkins et al. | 455/454 |
| 2008/0244419 A1 * | 10/2008 | Kurpick et al. | 715/756 |
| 2009/0133100 A1 * | 5/2009 | Buchwald et al. | 726/3 |
| 2009/0144302 A1 * | 6/2009 | Baldwin | 707/100 |
| 2011/0119282 A1 * | 5/2011 | Gorman et al. | 707/755 |
| 2012/0102111 A1 * | 4/2012 | Salesky et al. | 709/204 |
| 2012/0316962 A1 * | 12/2012 | Rathod | 705/14.54 |
| 2012/0324010 A1 * | 12/2012 | Pinches | 709/204 |

* cited by examiner

*Primary Examiner* — Chris Parry
*Assistant Examiner* — Caroline Jahnige
(74) *Attorney, Agent, or Firm* — Polsinelli PC

(57) ABSTRACT

A system is provided which enables customized sessions for data gathering and analysis. The system receives data and commands from one or more user devices to generate and modify a session dataset and to select and activate system functions. The results of user inputs and actions are published to other user devices in the session. One or more functions for generating datasets, organizing datasets and analyzing the datasets may be independently selected and activated. The system enables a data gathering and analysis session to be preconfigured with a predetermined set and order of functions or for a session to be conducted with a dynamic selection and activation of functions and a dynamic selection of the orders of functions. In some embodiments, there is provided a software as a service (SaaS) application for implementing the data gathering and analysis session functions.

23 Claims, 40 Drawing Sheets

Actions

Meeting: Requirements Gathering Workshop
*Question: What specific features should we add to our website to increase customer satisfaction?*

| | | | | | |
|---|---|---|---|---|---|
| 31 | Make a mobile version of your website that's compatible with all the major smartphone platforms | Research Modifications Needed for Mobile Platforms | Bob | 2012-04-11 | High | Started |
| 18 | Clean interface | Check out top clean interfaces for inspiration | Sarah | 2012-03-21 | Medium | Started |
| 23 | ability to purchase online using paypal, credit cards and debit cards...provide flexibility | Look into Paypal integration | Nora | 2012-03-21 | High | In Progress |
| 11 | consistent branding | Brainstorm with marketing and design team | Marketing Manager | 2012-03-20 | Medium | Pending |
| 11 | consistent branding | Develop prototype for website design consistent with branding | Design team | 2012-03-23 | high | Pending |
| 28 | Use landing pages effectively | Develop flow chart of linked pages | Web developer | 2012-03-31 | High | Pending |
| 28 | Use landing pages effectively | Marketing meeting to determine key landing pages | Marketing team | 2012-04-05 | High | Pending |

1. What specific features should we add to our website to increase customer satisfaction? / Actions   1 of 2

Powered By Powernoodle

Fig. 16(c)

| | | | | | |
|---|---|---|---|---|---|
| 34 | Link with social network sites so customers can interact with you using their choice of medium | Research which social networks our clients are using | Research Analyst | 2012-03-16 | High | Pending |
| 34 | Link with social network sites so customers can interact with you using their choice of medium | Work with web developer to add social media plug ins | Marketing and Web development team | 2012-04-04 | Medium | Pending |
| 41 | Clear instructions for product returns -- and our return policy available for customers to review. | Review Return Policy | Sales Dept. | 2012-03-30 | High | In process |
| 33 | Create a blog to get credibility and build customer trust | Create Blog | Sales Dept. | 2012-04-16 | Moderate | Pending |
| 4 | price comparison | Price review | Vivian | 2012-02-01 | High | In process |
| 17 | Provide different ways to find products | Review search categories | Sales and Purchasing Dept. | 2012-03-30 | High | In Process |

Powered By Powernoodle     1. What specific features should we add to our website to increase customer satisfaction? / Actions    2 of 2

SYSTEM FOR DYNAMIC DATA GATHERING AND ANALYSIS

TECHNICAL FIELD

Example embodiments relate to the fields of data gathering and analysis and systems and methods for supporting interactive and real-time or asynchronous data analysis.

BACKGROUND

Data gathering and analysis systems typically provide a specific set of functions and a specific order of functions for receiving and analyzing data and generating a system output. Such systems also may require that users enter information in real time and conform the users' data gathering and decision making processes to the specified functions and order of functions provided by the system. Such systems may not allow a flexible and dynamic selection of data gathering and analysis steps.

BRIEF DESCRIPTION OF THE DRAWINGS

Reference will now be made, by way of example, to the accompanying figures which show example embodiments of the present application, and in which:

FIGS. 16(a) and (b) illustrate an example report generated in accordance with one implementation of the present disclosure.

Figure 1:
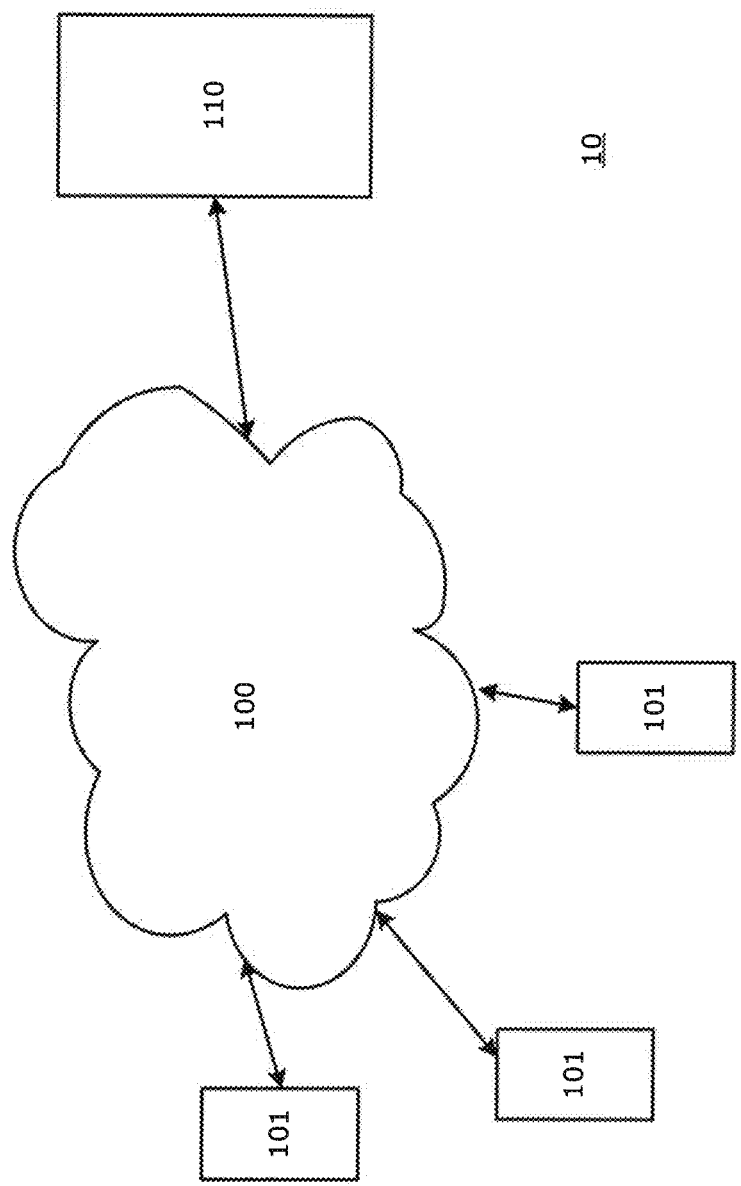
FIG. 1 is a block diagram illustrating a system in accordance with one implementation of the present disclosure.

Like reference numerals are used throughout the Figures to denote similar elements and features While the invention will be described in conjunction with the illustrated embodiments, it will be understood that it is not intended to limit the invention to such embodiments. On the contrary, it is intended to cover all alternatives, modifications and equivalents that may be included within the spirit and scope of the invention described herein.

DETAILED DESCRIPTION OF EXAMPLE EMBODIMENTS

According to embodiments of the present disclosure, there is provided a system which enables customized sessions for data gathering and analysis. The system receives data and commands from one or more user devices to generate a session dataset and to select and activate system functions. The results of user inputs and actions are transmitted and displayed to other user devices 101 in the session. One or more functions for generating datasets, organizing datasets and analyzing the datasets may be independently selected and activated. Additional functions generate one or more outputs from the session dataset such as a report based on the data gathering and analysis session. The session dataset may be provided as an input to any function and may be modified by any function. The output of a function includes a modified dataset or an unmodified dataset. In one embodiment, the system enables a data gathering and analysis session to be preconfigured with a predetermined set and order of functions. In another embodiment, the system enables a dynamic selection and activation of functions and a dynamic selection of the orders of functions. In some embodiments, the data gathering and analysis session is conducted asynchronously. In some embodiments, there is provided a software as a service (SaaS) application for implementing the data gathering and analysis session functions.

In accordance with example embodiments, there is generally provided a system for conducting a data gathering and analysis session over a communications network. The system comprises a server configured to receive data and commands from one or more client devices; store one or more datasets from the received data in a memory; transmit data to the one or more client devices; configure one of a plurality of functions in any order to modify one of the datasets; and activate a configured function in any order to modify one of the datasets. In one embodiment, the system includes one or more electronic devices configured as client devices.

In accordance with example embodiments, there is generally provided a computer-implemented method for conducting a data gathering and analysis session among multiple users over a communications network. The method comprises storing a dataset in memory; configuring one of a plurality of computer implemented functions in any order to modify the dataset, each function comprising one or more actions; activating a configured function in any order; performing one or more actions of an activated function to modify the dataset; and displaying the modified dataset to one or more users.

In accordance with example embodiments, there is generally provided a computer readable storage medium in an electronic server device, the medium having stored thereon computer-readable and computer-executable instructions, which, when executed by a processor, cause the electronic server device to perform actions comprising: storing a dataset in memory; receiving commands; in response to received commands, configuring one of a plurality of computer implemented functions in any order to modify the dataset, each function comprising one or more actions; activating configured functions in any order; performing one or more actions of an activated function to modify the dataset; and displaying the modified dataset to one or more users.

FIG. 1 illustrates a system 10 according to embodiments of the present disclosure. The system 10 includes a server 110 configured to support a data gathering and analysis session as described herein. The system 10 includes one or more electronic devices 101 which communicate with the server 110 over a communications network 100.

The electronic devices 101 include personal computers, lap top computers, smart phones, mobile telephones, personal digital assistants or any other similar electronic devices having a user interface for receiving commands and data from a user, a communications interface for exchanging data with the server 110 over the communications network 100, and a display for providing information to the user. The electronic devices 101 are configured to support the applications described herein. In some embodiments, the electronic devices 101 are configured to support an internet browser and Adobe™ Flash applications for receiving and displaying information generated by the server 110 including messages and display windows. In other embodiments, different browsers and applications may be used for receiving and displaying information generated by the server 110, such as HTML5 applications.

The communications network 100 comprises a wired or wireless communications network or a combination of wired and wireless communications networks. In some embodiments, the communications network 100 includes public networks, such as the Internet, private networks, virtual private networks or a combination thereof. The communications network 100 may provide secure communications using encryption techniques. The communications network 100 supports communications between the electronic devices 101 and between the electronic devices 101 and the server 110.

Figure 2A:
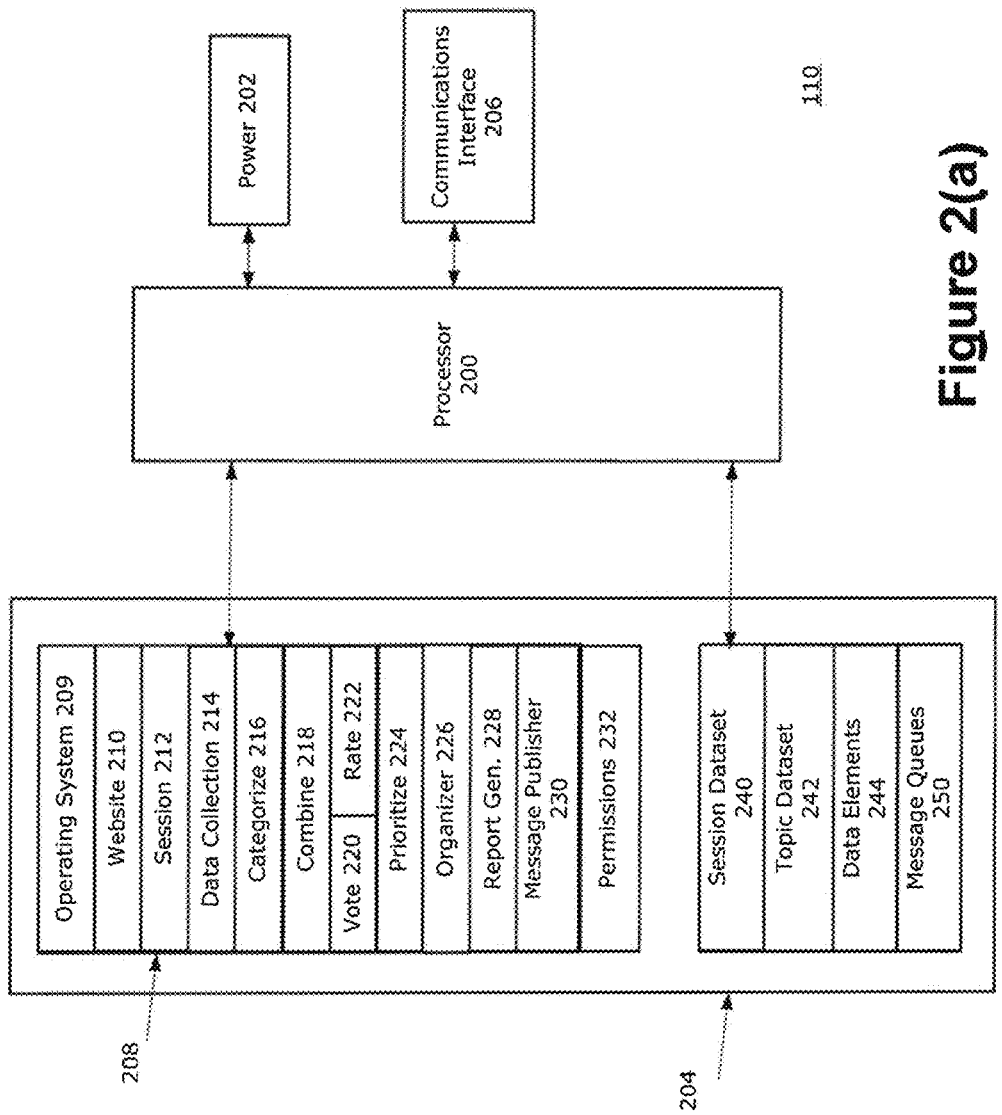
FIGS. 2(a) and (b) are block diagrams of a server and system, respectively, in accordance with an implementation of the present disclosure.

FIG. 2(a) illustrates a high level block diagram of a server 110 according to an embodiment of the present disclosure. The server 110 includes at least one processor 200, a power source 202, a memory 204 and a communications interface 206 for sending and receiving data over the communications network 100. The at least one processor 200 controls the operations of the server 110. The processor 200 interacts with the memory 204 and with the communications interface 206 to support the functions and communications described herein. In some embodiments, the memory 204 comprises one or more of a flash memory, random access memory (RAM), read only memory (ROM) or hard disk. The memory 204 may be implemented in the server 110 or separate from the server 110. The power source 202 may comprise an input to receive power from an external power supply, one or more batteries or a combination thereof. The communications interface 206 supports communications between the server 110 and one or more electronic devices 101. Communications may comprise messages published or sent to the electronic devices 101, data and actions received from the electronic devices 101.

The processor 200 executes one or more functional modules 208 stored in the memory 204. The modules 208 comprise an operating system 209 and other applications to provide the functions and operations described herein including a website module 210, a session module 212, a data collection module 214, a categorize module 216, a combine module 218, a vote module 220, a rate module 222, a prioritize module 224, an organizer module 226, a report module 228, a message publishing module 230 and a permissions module 232. The operations implemented by the modules 208 may be realized by a plurality of modules or as parts of other modules. In some embodiments, the modules 208 are in the form of computer readable instructions. The memory 204 also stores one or more session datasets 240, topic datasets 242 and data elements 244 as described herein. One or more message queues 250 also are stored in the memory 204. Each of the modules 208 provide functions to receive, modify and/or output data stored within the session data 240, topic dataset 242 and data elements 244. Additional modules and functions may be provided. The server 110 and memory 204 may be implemented in multiple components or servers including, for example, a backup server (not shown). The modules 208 include other applications to support communications between the server 110 and the devices 101.

Figure 2B:
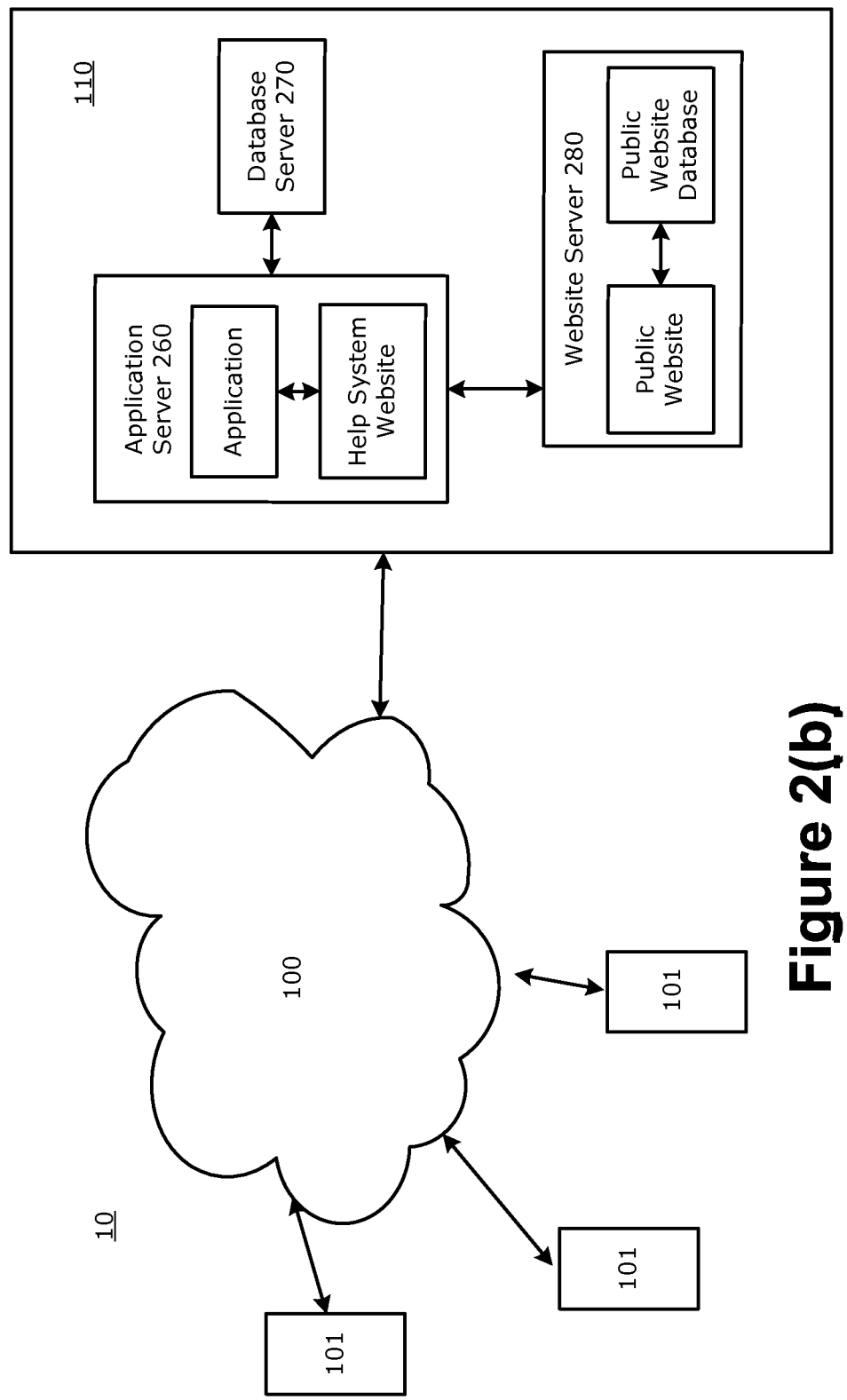

FIG. 2(b) illustrates another embodiment of a server 110 in which three separate server components may be used including an application server 260, a database server 270 and a website server 280. In one embodiment, users obtain access to the server applications through a website supported by the website server 280.

Figure 3:
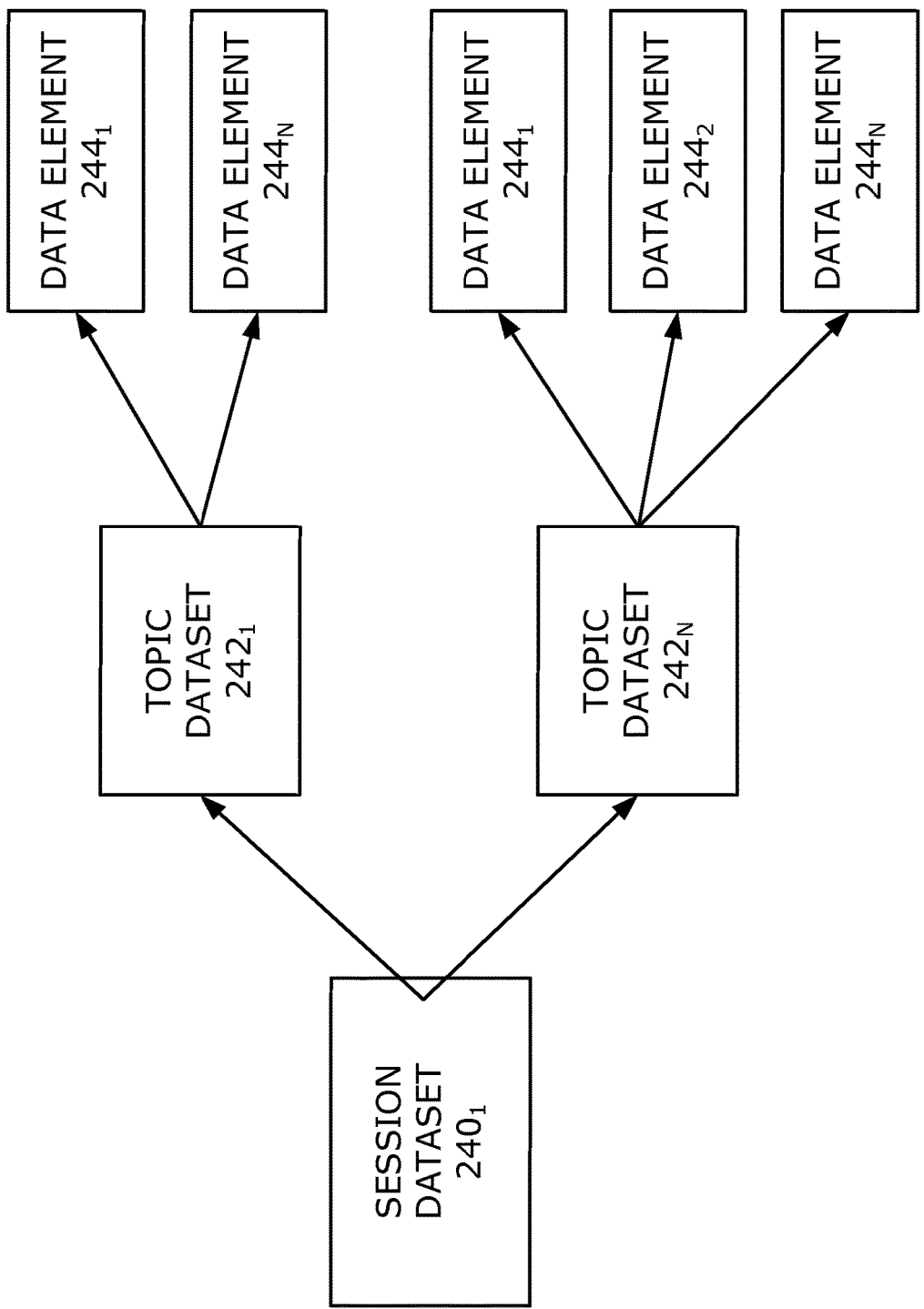
FIG. 3 is a block diagram of example datasets in accordance with one implementation of the present disclosure.

The system 10 is configured to create and store three different types of datasets as illustrated in FIG. 3. An example session dataset $240_1$ is created for a data gathering and analysis session and the session dataset $240_1$ is stored in the memory 204. A topic dataset includes one or more topics $242_1$ through $242_N$ which are associated with the session dataset 240. Additionally, one or more data elements $244_1$ through $244_N$ may be created and associated with each topic $242_i$. The one or more data elements 244 associated with a topic 242 comprises an idea dataset 245. Data elements 244 may store alphanumeric text, video, audio, photographs or other electronic files or data.

Figure 4:
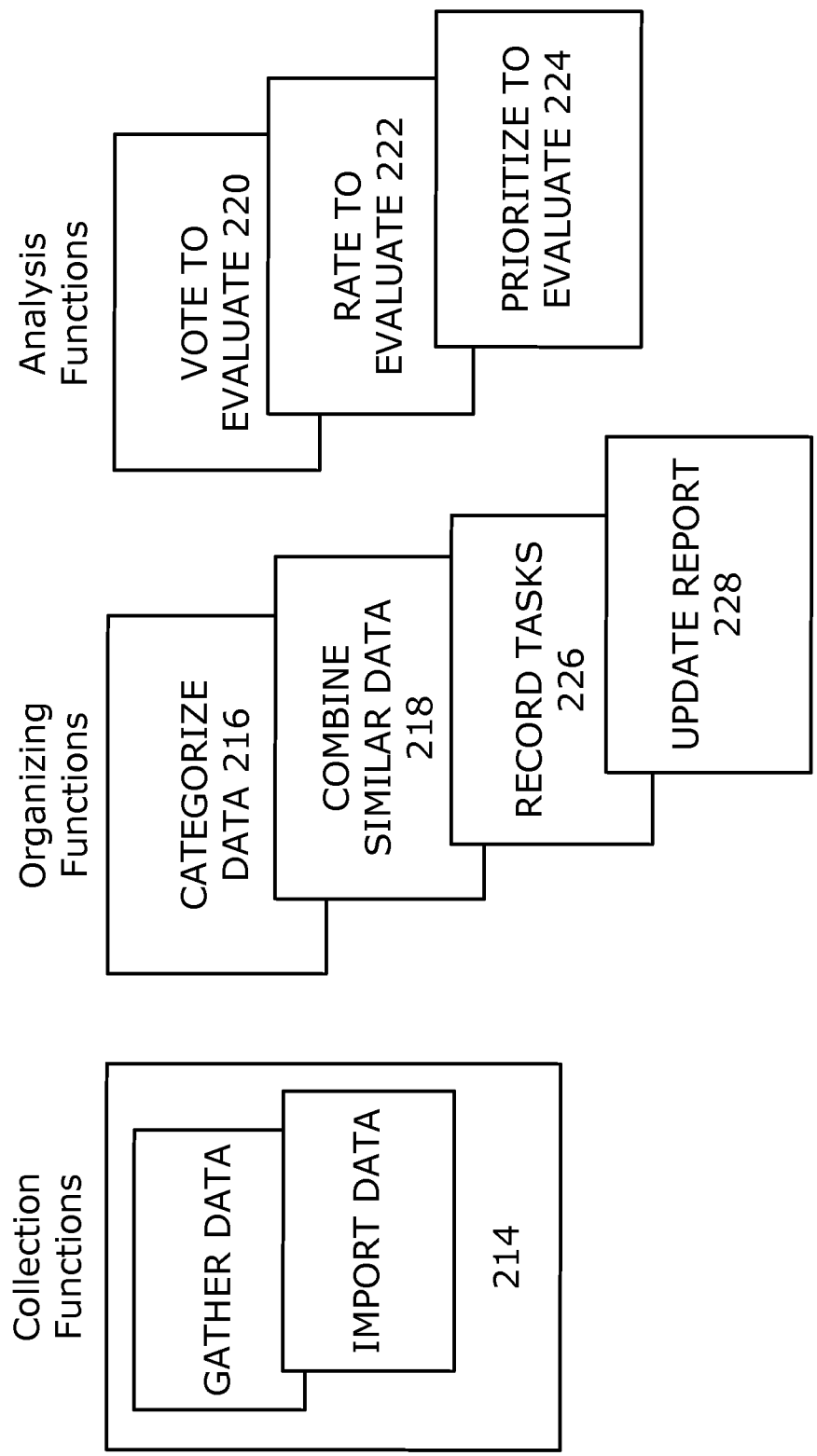
FIG. 4 is a block diagram of system functions in accordance with one implementation of the present disclosure.

FIG. 4, illustrates example modules 208 and functions supported by the system 10 of the present disclosure. A function comprises a set of operations or actions which can be performed on the session dataset 240, topic dataset 242 and idea dataset 245. Data collection functions support actions to receive data from users through electronic devices 101 and over the communications network 100. In one embodiment, a data collection module 214 provides functions to gather and import data to create a session dataset 240, topic dataset 242 and idea dataset 245. Organizing functions support actions to add information to a data elements 244 and to export data elements 244 to an electronic file, device or other program and merge data elements. In one embodiment, the categorize module 216 and the combine module 218 provide functions to categorize and combine data elements 244 within a session dataset 240 as described herein. The organizer module 226 provides additional functions to record tasks or "action items" entered by a user and associate tasks with the data elements 244. Analysis functions support actions to analyze, code and reorder data elements 244. In one embodiment, the modules 208 include the vote module 220, rate module 222 and the prioritize module 224 which provide actions to analyze and modify the data elements 244. It will be appreciated that additional functions to collect, organize and analyze the session dataset 240, topics 242 and idea dataset 245 may be provided. In one embodiment, a function is selected and configured, activated and stopped before the next function is selected. In another embodiment, one or more functions may be selected and configured before a first function is activated. In one embodiment, once the first function is stopped, a second function may be activated.

In some embodiments, one or more modules 208 provide additional operations for the data gathering and analysis system. A website module 210 may generate and display a website through the communications interface 206 to enable users to access the system and create a user account. A session module 212 provides additional operations for defining and establishing a session and designating users to attend a session. A permissions module 232 may support actions to assign and manage permissions for users, to limit the actions taken by users with different permissions and to limit the information provided to a user. A report module 228 is provided in some embodiments to supports actions to generate, update and output reports from the session dataset 240, topic dataset 242 and idea dataset 245 including data elements 244. The modules 208 also perform operations to transmit elements for a user interface display to the electronic devices 101 and to receive data and requests from the electronic devices 101. The message publishing module 230 controls the transmission of messages to provide updates of user inputs and actions to the other devices 101 in the session. In one embodiment, the modules 208 comprising the instructions for providing the data gathering and analysis session functions and operations disclosed herein are stored on a computer readable media as computer-readable instructions for execution by a processor in an electronic device, such as a server.

Figure 5:
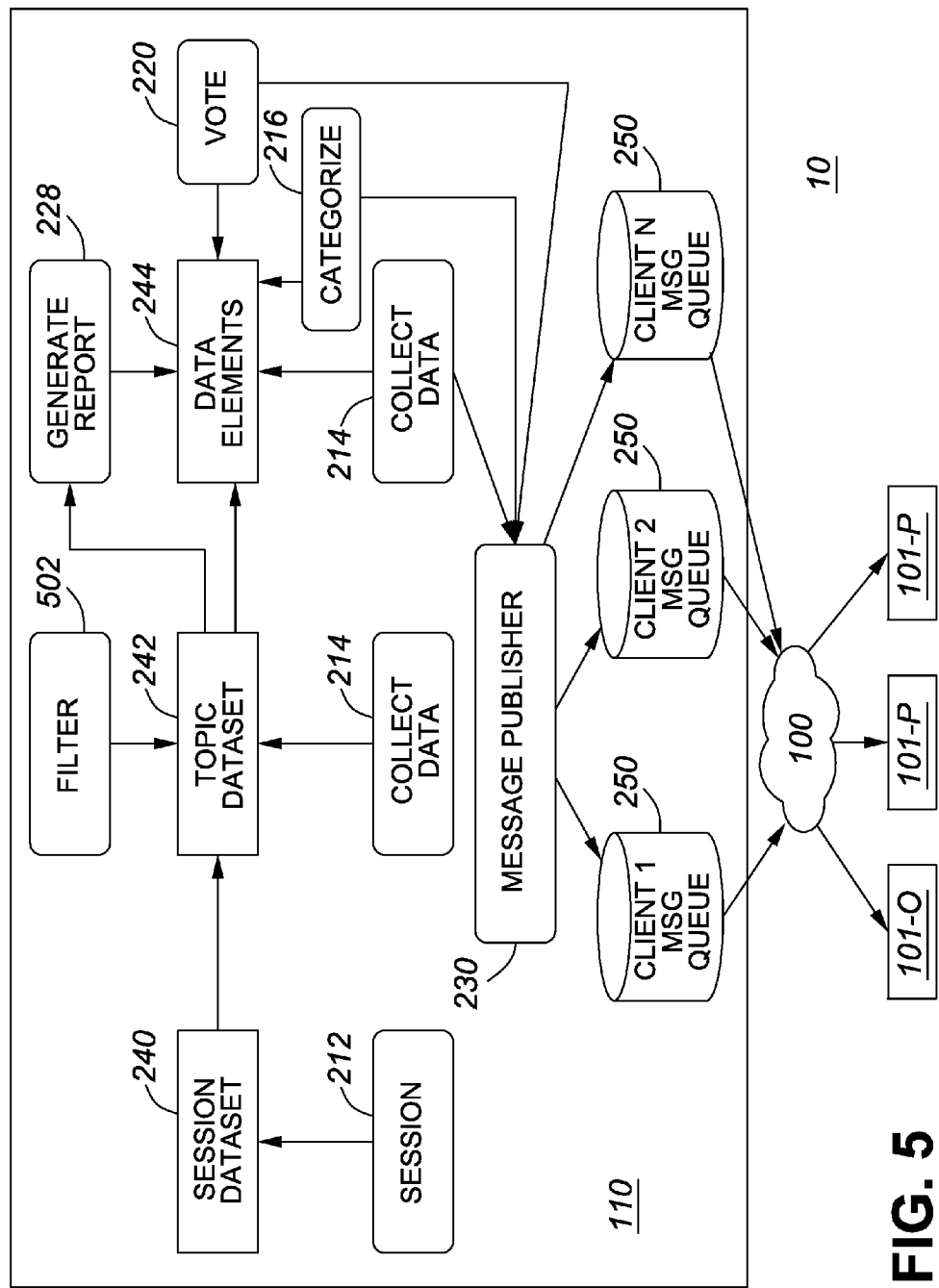
FIG. 5 is a block diagram illustrating a system in accordance with one implementation of the present disclosure.
Figure 5V:
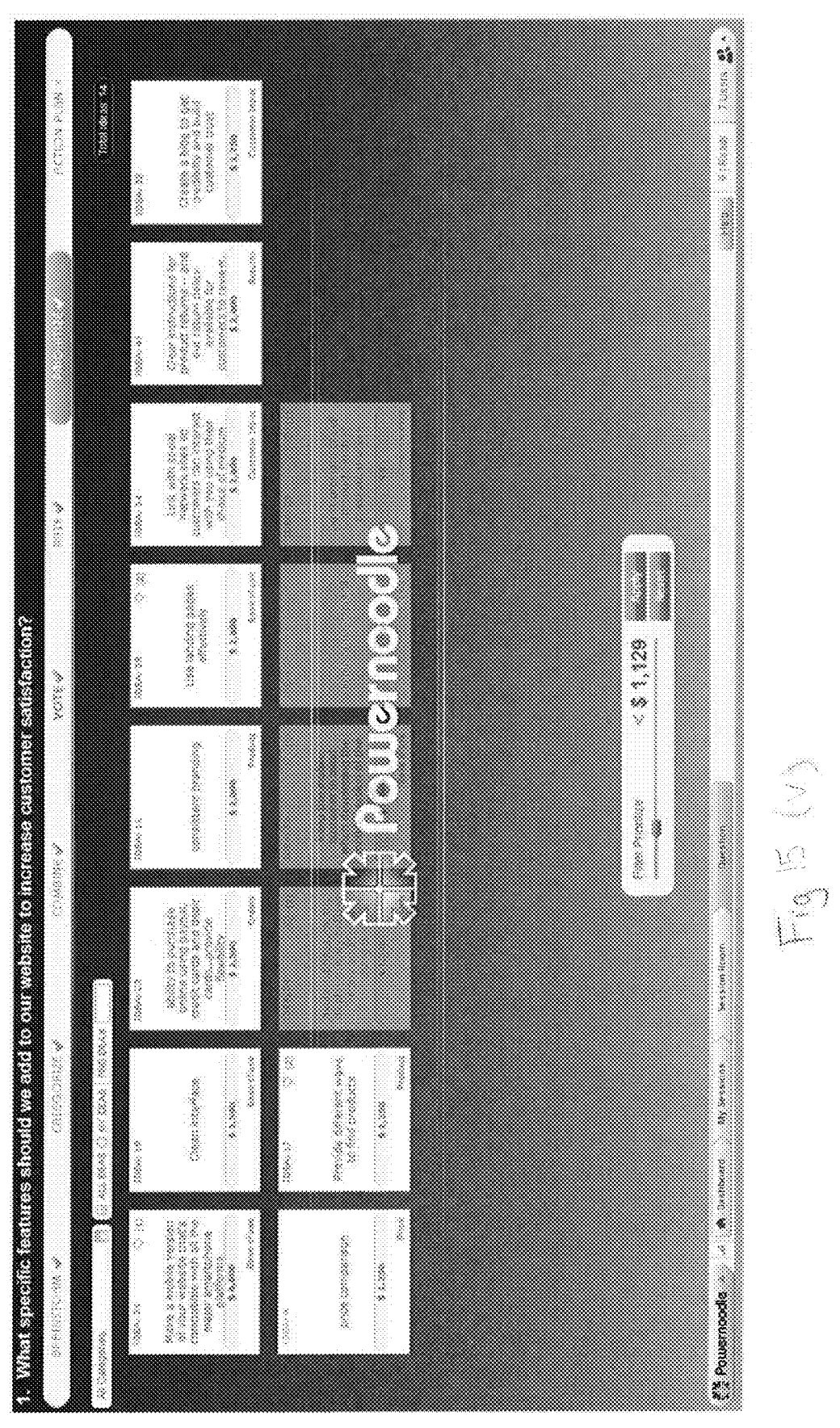

FIG. 5 illustrates a high level view of the system 10 in accordance with an embodiment of the present disclosure. The server 110 provides functions to enable users to establish a session, to collect data, including data elements 244, from a variety of sources and to analyze and evaluate the data elements 244. The functions may be linked together in real time, such as during a meeting of users, or functions may be performed at different times by different users. As illustrated in the example of FIG. 5, a session module 212 provides actions to create a session and establish a session dataset 240. Data collection module 214 supports functions and actions to import and collect data to create a topic dataset 242, idea dataset 245 and data elements 244 associated with the session. Different functions may be selected and activated to modify the data elements, for example, to categorize 216 the data elements 244. As described above, functions may include one or more actions, such as a filter action 502, for modifying a dataset. In one embodiment, a vote module 220 supports actions to analyze the data elements 244. One or more reports may be created by a report module 228 and displayed or downloaded to capture the output of the session, including the analyzed data elements 244 and tasks or user action items created by session participants. As a specific function and action occurs, the action is published through a message publisher 230 to provide updates of actions and information from a session to message queues 250 for delivery through the communications network 100 to the one or more electronic devices 101 of users participating in the data gathering and analysis session. The actions taken by a user through one electronic device 101 is instantaneously presented to other electronic devices 101 for users in the session.

In one embodiment, the permissions module 232 enables two types of user permissions to be defined in the system 10 for each session: an organizer and a participant. The system 10 supports a session wherein one user is identified as the session organizer and one or more users are identified as session participants. The session organizer is illustrated in FIG. 5 in association with electronic device 101O and one or more participants are illustrated in association with electronic devices 101P. Specific functions and actions within the functions may be limited and available only to a user with permissions as a session organizer. In one embodiment, the session organizer is permitted to create a session, identify the participants in a session, select the types and orders of functions performed within the session and control the timing of the functions or steps in the session. The session organizer also is permitted to take actions which are available to a user with permissions as a participant. In another embodiment, a third permission type is defined to assign permissions to a user as an administrator. The administrator may be allowed to create and assign organizer permissions to one or more users, to control the status of one or more sessions and to modify or archive a session dataset 240 and associated topics 242 and idea dataset 245. The administrator also may act as an organizer or participant. Other permissions or restrictions may be associated with each of the administrator, organizer and participant permission types, including but not limited to limiting the number of organizers an administrator may identify or limiting the number of participants an organizer may select for a session.

Figure 6:
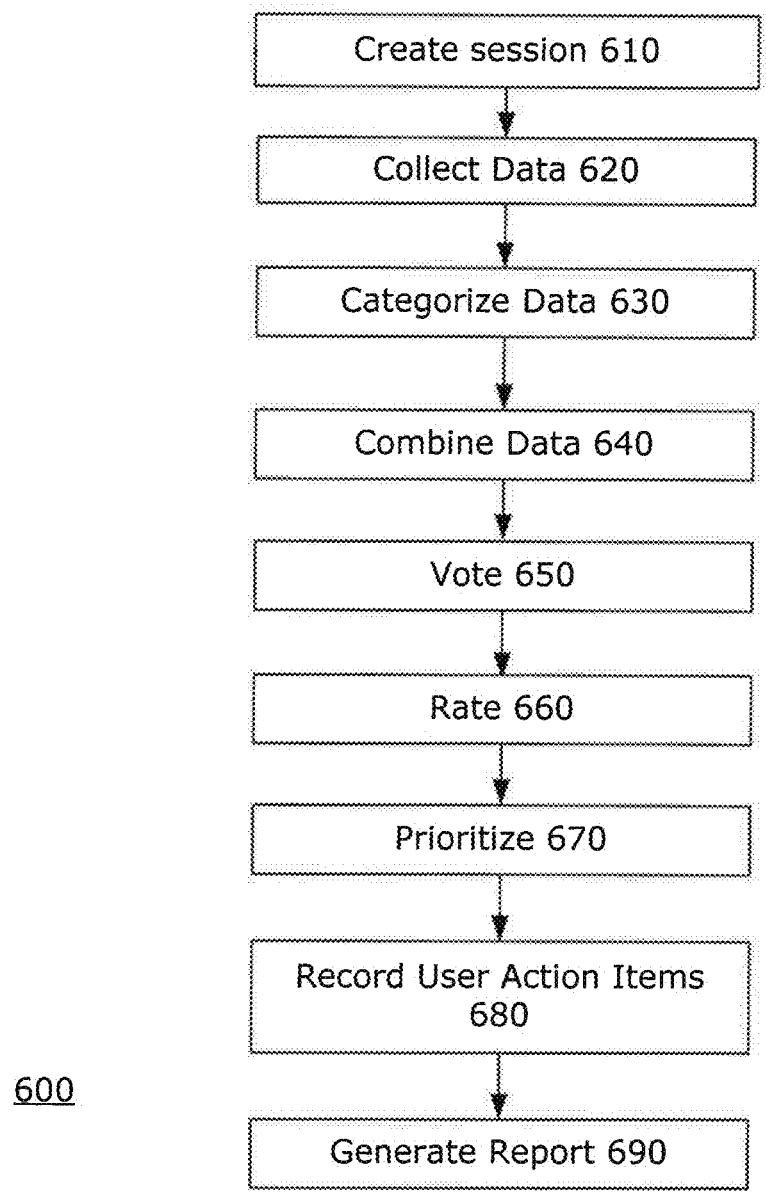
FIG. 6 shows, in flowchart form, an example session in accordance with implementations of the present disclosure.

FIG. 6 illustrates a sample session for data gathering and analysis utilizing the system and applications of embodiments of the present disclosure. In one embodiment, in response to a request from a device 101, user account is created by the server 110 and associated with a user of the device 101. One or more user accounts may be associated with a device 101. The user account and device 101 may be associated with organizer or participant permissions. At 610, in response to a request from a device 101, the server 110 creates or adds a session. An organizer device 101 submits a request to create a new session and also may transmit data including a session name, one or more topics 242 for the session and information identifying one or more devices 101 as participants in the session. At 620, data is collected by the server 110 to create and add to the session dataset 240 and idea dataset 245. Data may be imported to the system 10 by a device 101 with organizer permissions or received as data elements 244 from all devices 101 in a session as described below. The collected or imported data elements 244 comprise an idea dataset 245 and are associated with a topic 242. At 630, categories may be defined and in response to requests from one or more devices 101, each data element 244 may be assigned by the server 110 to a category in order to organize the data elements 244. At 640, in response to requests from one or more devices 101, data elements 244 may be combined to eliminate redundant or duplicate data elements 244. The system 10 supports the combining of data elements 244 to remove some data elements 244 and create new combined data elements 244. Three functions may be performed to analyze the data elements by voting 650, rating 660 and/or prioritizing 670 the data elements 244. In some embodiments, an analysis function is configured and activated in response to a request from a device 101, such as a device 101 with organizer permissions. The analysis functions provide a prompt to the devices 101 to transmit information regarding, for example, a vote, rating or priority of one or more data elements 244. The server 110 receives the vote, rating and priority information and modifies data elements 244 to store the received information. Additional functions also may be provided to analyze the data elements 244. These functions may be implemented in response to a request from a device 101 to remove data elements 244 which receive fewer votes or lower ratings or priorities. At 680, the server 110 may record or store tasks or user action items submitted by devices 101 in association with the data elements 244 in order to create a record of the session and tasks to be taken by users as a result of the session. At 690, a report may be generated by the server 110 to capture the output of the session including but not limited to data elements 244, ratings and tasks. In some embodiments, a report may be generated at one or more of the different steps illustrated in the method 600.

Figure 7:
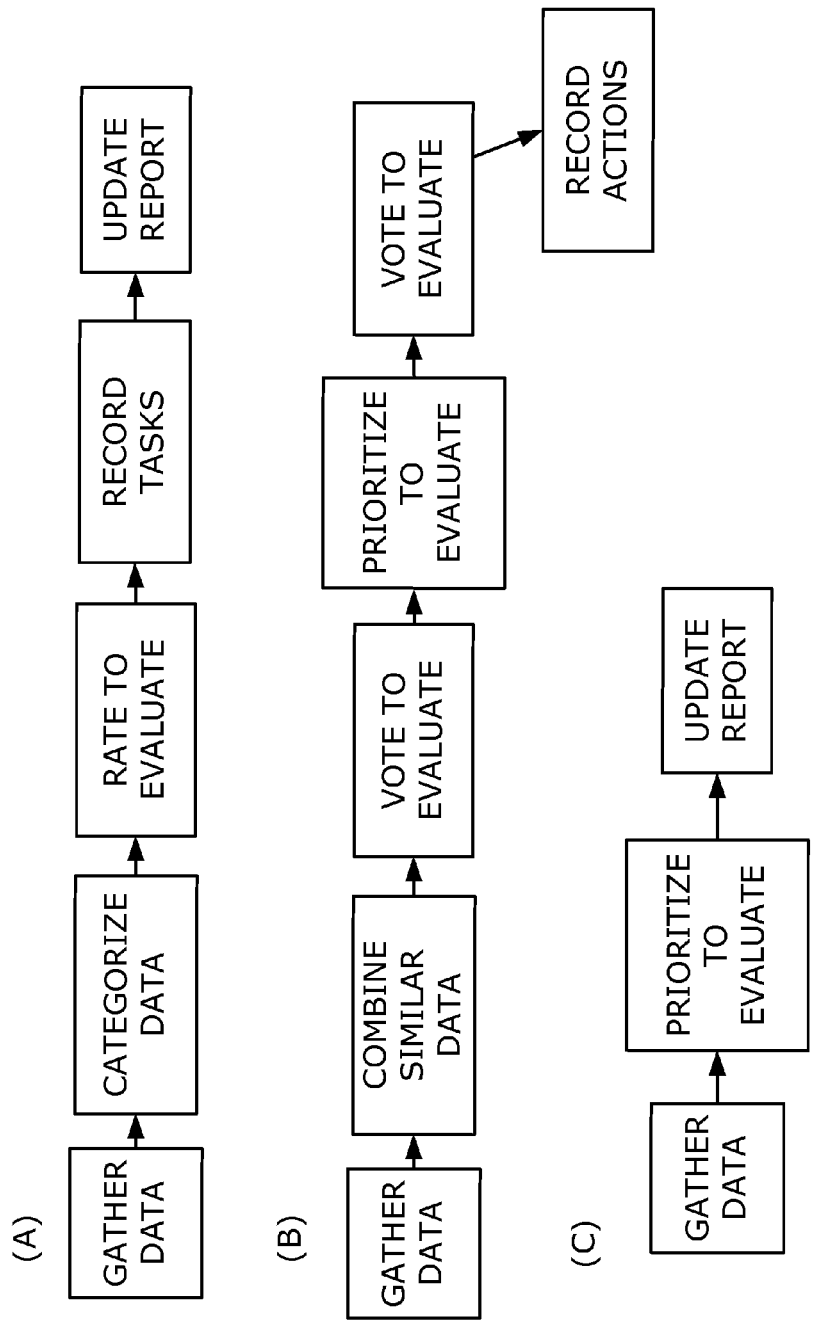
FIGS. 7(a) to (c) are block diagrams of example sessions in accordance with implementations of the present disclosure.

Once a session is created 610, and initial data collected 620, the system 10 provides for the selection, activation and completion of functions or steps in any order which supports a variety of methods and processes for gathering and analyzing data. One or more steps or functions also may be omitted or repeated. The output of each function is a modified or unmodified dataset, such as the session dataset 240 or idea dataset 245, which can immediately become available to another function. As illustrated in FIG. 7, a data gathering and analysis session using the system 10 may include functions or steps to (a) collect data elements, categorize data elements, rate data elements, record tasks and create a report. Alternatively, a data gathering and analysis session using the system 10 may include functions or steps to (b) import data elements, combine data elements, conduct a first vote on data elements, prioritize data elements, conduct a second vote on the prioritized data elements and record. Alternatively, a data gathering and analysis session using the system 10 may include functions or steps to (c) collect data element, prioritize data elements and generate a report.

Figure 8:
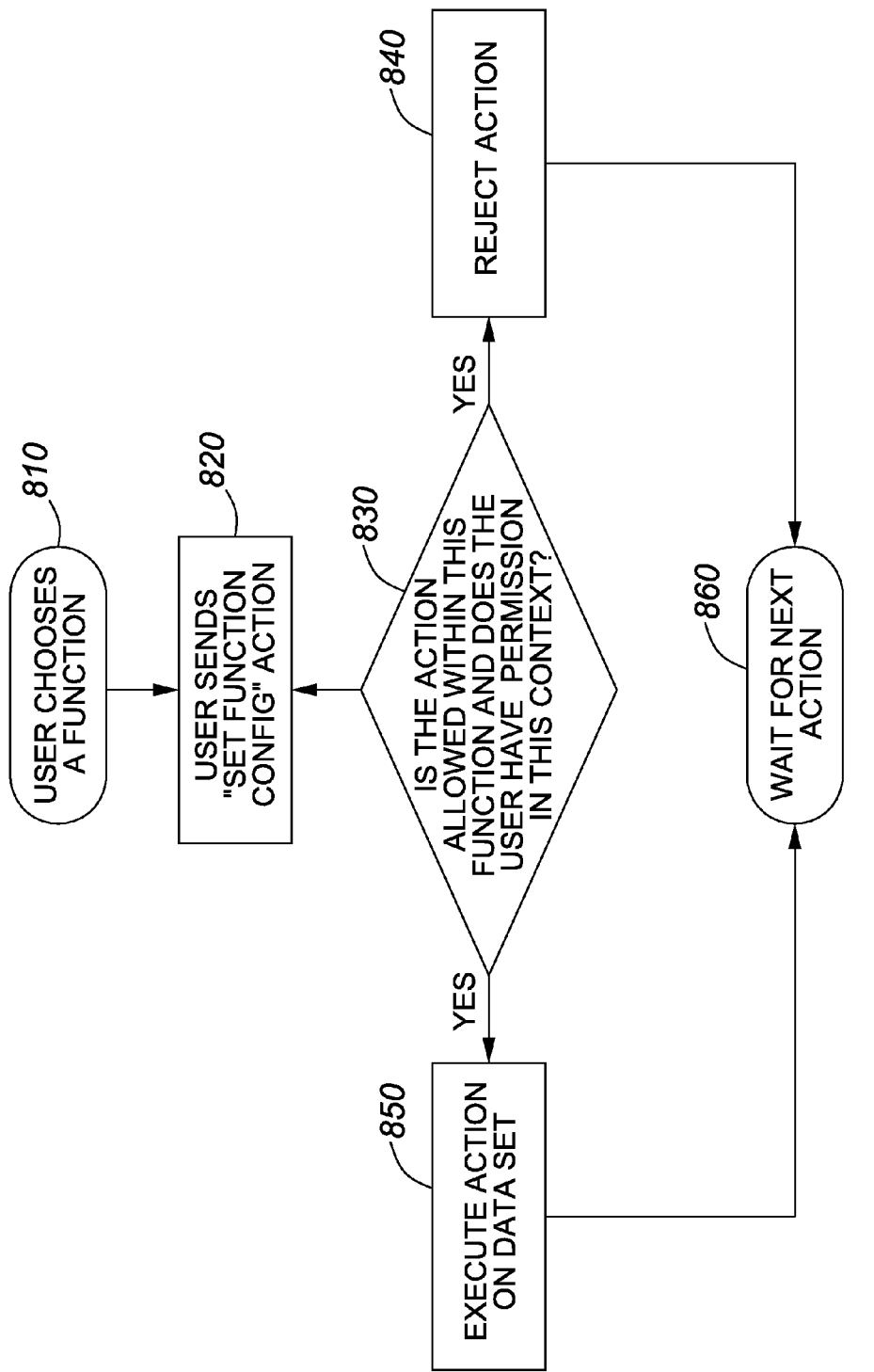
FIG. 8 shows, in flowchart form, an example method in accordance with implementations of the present disclosure.
Figure 9:
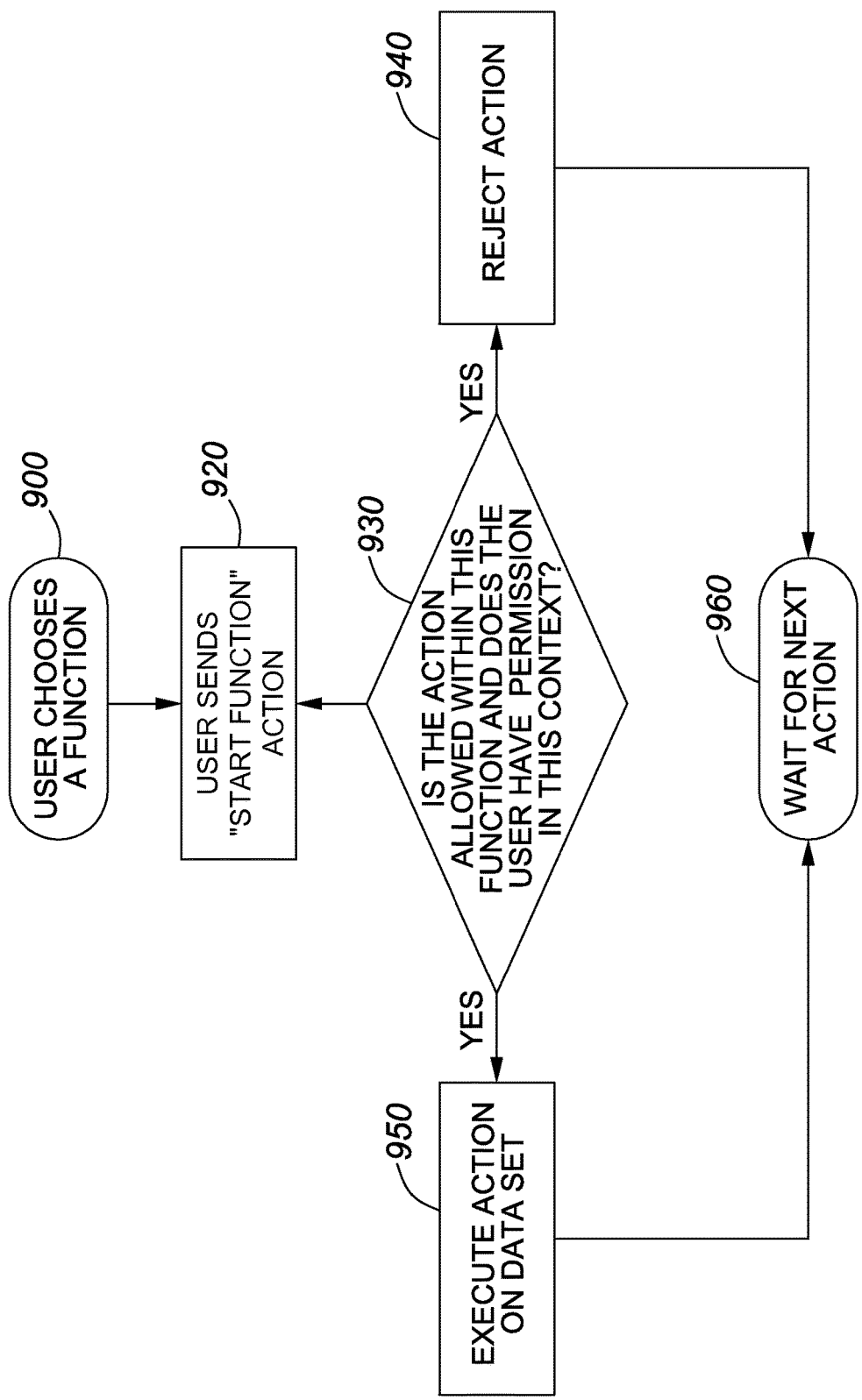
FIG. 9 shows, in flowchart form, an example method in accordance with implementations of the present disclosure.

The system 10 includes three constructs: functions, actions and the context. As described above, the functions supported by the system 10 and server 110 include functions to collect data, combine data and prioritize data. A function comprises a set of operations or actions which can be performed on the session dataset 240, topic dataset 242 and idea dataset 245 including data elements 244. A function typically encapsulates data analysis steps such as "brainstorm", "categorize", "vote" and "rate". An action comprises a set of rules for manipulating data and includes operations such as "add idea" or "set rating". For example, an action to enter information within a data collection function may include a rule limiting the information to a set number of characters. Certain actions only may be executed during certain functions and certain actions only may be executed in response to a request from a device 101 with specific permissions, such as a organizer permissions. In some embodiments, the same action may be allowed within a number of different functions. The context is a pointer to which dataset is being manipulated and the iteration number of the function. The context acts as a channel through which actions manipulate datasets. For example, if the vote function has been selected twice there will be two iterations reflected in the dataset. Example contexts include "Session_SESSIONID", "Topic_TOPICID" and FUNCTION_ITERATION which may correspond to a session dataset 240 and topics dataset 242 in a particular session. In some embodiments, devices 101 are permitted to request and receive information regarding a dataset at a previous state prior to modifications by other functions and to reset a dataset to a previous state. The context may be used to determine whether a requested action may be performed by a device 101 within the specific function as illustrated in FIGS. 8 and 9. The context also is used by the permissions module 232 and message publishing module 230 to determine the information that is available and what information should be sent to devices 101 with permissions as organizers and devices 101 with permissions as participants. In some embodiments, a context list and a user list (not shown) are stored in memory 204. The context list comprises a list of contexts that are currently active and the user list comprises a list of devices 101 and associated users for each context.

Once a session is created and initial data collected, an input may be received to configure and activate any function at any time in order to manipulate the datasets created for the session. The configuration of a function is decoupled from the activation or start of a function and this allows users to create a customized set of functions for a data gathering and analysis session either in advance of a session or while a session is being conducted. For example, as illustrated in FIG. 8, after an input is received from a device 101 to select a function 810, a "set function config" action is submitted 820 to the server 110. A determination 830 is made by the server 110 whether the action, in this case to configure the function, is permitted within the function and whether the device 101 has the permissions to request this action within the current context. If the action is not allowed or if the device 101 does not have the necessary permissions, the action is rejected 840. If, within the current context, the action is allowed and the device 101 has the necessary permissions, the action is executed 850 on the dataset. As a result of the "set function config" action, configuration data within the topic dataset 242 is updated and stored. As well, after a function is chosen, a user interface may be provided with a prompt to select one or more parameters to configure for the selected function. For example, when configuring a function to gather data, a user interface of an organizer device 101 may be prompted to select an option to allow the server 110 to display data elements 244 only to a device 101 which submitted the data elements 244 or to allow the server 110 to display all data elements 244 to all devices 101. After the action is rejected 840 or executed 850, the system waits to receive the next action 860.

FIG. 9 illustrates steps for activating a function. After a user input selecting a command to activate or start a function 910 is received, a "start function" action is submitted 920 to the server 110. A determination 930 is made by the server 110 whether the action, in this case to start the function, is permitted within the function and whether the permissions of the device 101 which transmitted the action, as an organizer or participant, allows the server 110 to perform the action within the current context. If the action is not allowed or if the device 101 does not have the necessary permissions, the action is rejected 940. If, within the current context, the action is allowed and the device 101 has the necessary permissions, the action is executed 950 on the dataset. As a result of the "start function" action, the requested function is set as the active function for the topic 242. As well, one or more user interfaces may be provided with a prompt to respond to the activated function. For example, once a function to gather data is activated, a display window or command box may be displayed on the one or more electronic devices 101O, 101P of users in the session with instructions to create and submit a data element 244. After the action is rejected 940 or executed 950, the system waits to receive the next action 960.

As described above, a function comprises a set of operations or actions which can be performed on the session dataset 240, topic dataset 242 and idea dataset 245 including data elements 244. After a function and action occur, the action is published through a message publisher 230 to provide updates of actions and information from a session to message queues 250 for delivery through the communications network 100 to the one or more electronic devices 101O, 101P of users participating in the data gathering and analysis session. User devices 101O, 101P are able to receive and display updated information for the session, session dataset 240, topics 242 and data elements 244 based on the actions of one or more users devices 101O, 101P.

Example embodiments of methods according to the present disclosure implemented by the server 110 for sending and receiving data to and from the electronic devices 101 of one or more users in a session are illustrated in FIGS. 10 to 14. In some embodiments, data is transmitted by the server 110 to the electronic devices 101 as formatted messages, such as a binary serialization formatted message. In one embodiment, messages are generated and transmitted in an Adobe™ Action Message Format (AMF) but other serialized message formats may be used. Upon the creation of a session and addition of one or more user devices 101 in the session, a message queue 250 is created in memory 204 for each device 101 in the session, including the devices 101 of users as participants and session organizer. The message queue 250 comprises an inter-process data store which operates as a queue for data.

Figure 10:
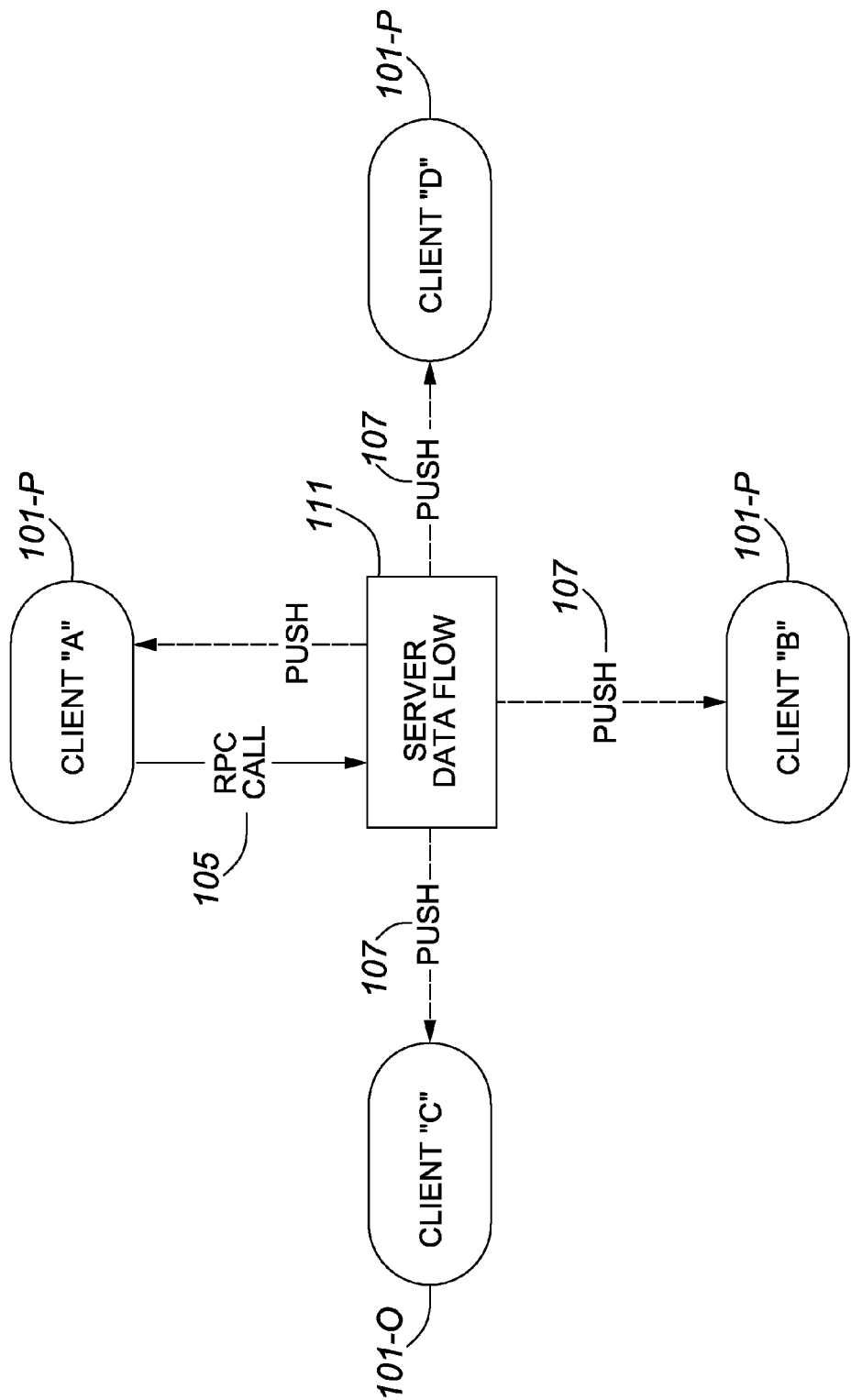
FIG. 10 shows, in flowchart form, an example method in accordance with implementations of the present disclosure.

As illustrated in FIG. 10, a user device 101 may submit a request in the form of a remote procedure call 105 (RPC) to the server 110 to take an action in association with a function. If the action is permitted and implemented, the results of the action are published according to a server data flow method 111. One or more messages are transmitted or pushed 107 to the other user devices 101 in the session, illustrated in FIGS. 10 to 14 as "Client A" through "Client D" or "Client X".

Figure 11:
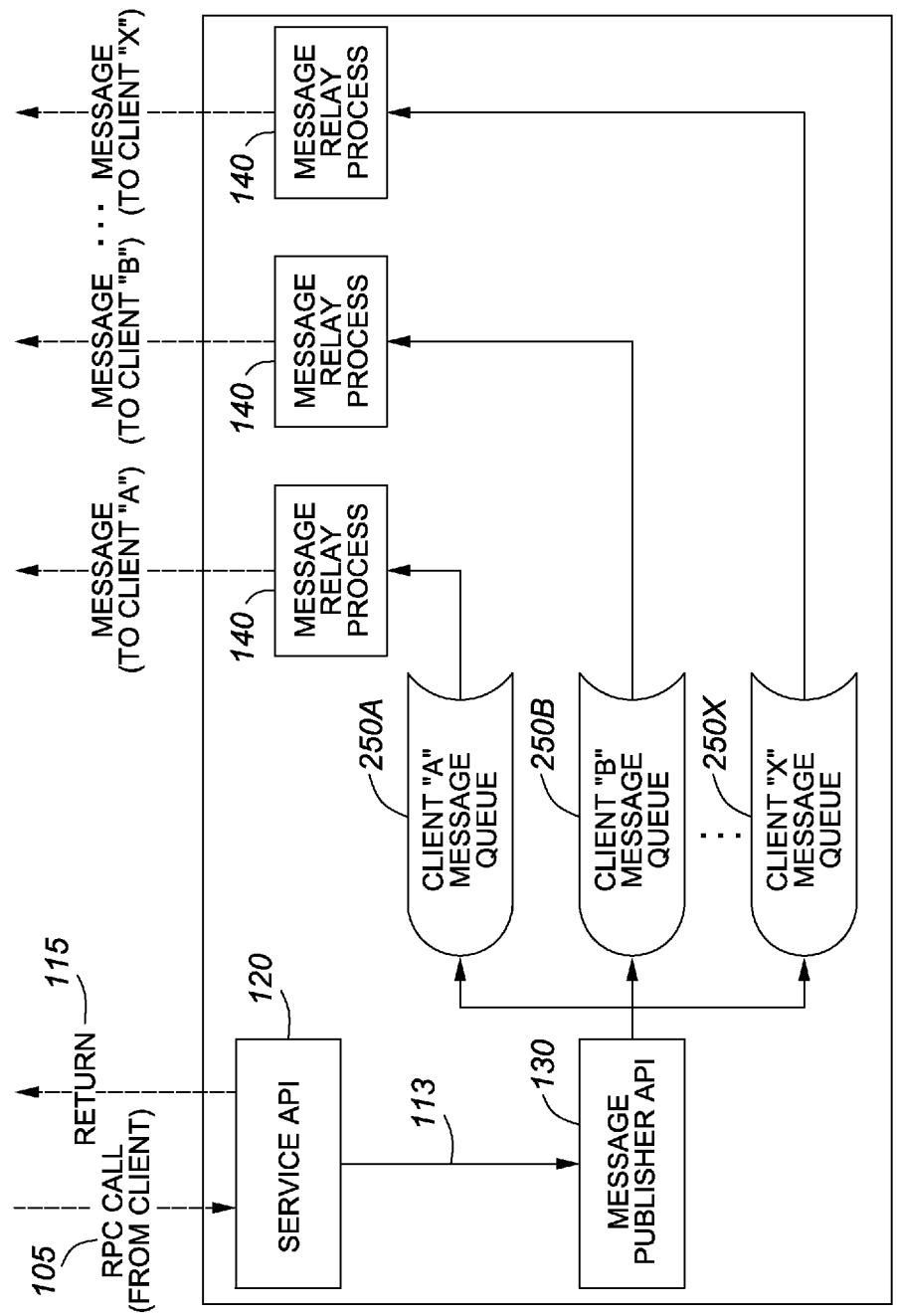
FIG. 11 shows, in flowchart form, an example method in accordance with implementations of the present disclosure.

A flowchart of an example server data flow method 111 is illustrated in FIG. 11. When an action is initiated by a user device 101 and an RPC 105 is received by the server 110, the server 110 undertakes a server application method 120 to implement the action. If the result of the action is successful 113, messages are published to the other user devices 101 or client devices 101 in the session. If the result of the action is not successful, an error result is sent 115 to the user device 101 or client device 101 which initiated the action. As illustrated in FIG. 11, as a result of a message publishing method 130, a message is stored to one or more message queues $250_A$, $250_B$, $250_X$ associated with the session. The messages are transmitted by a message relay process 140 to the electronic devices 101 of the one or more users or clients, such as Client A, Client B and Client X, associated with a session.

Figure 12:
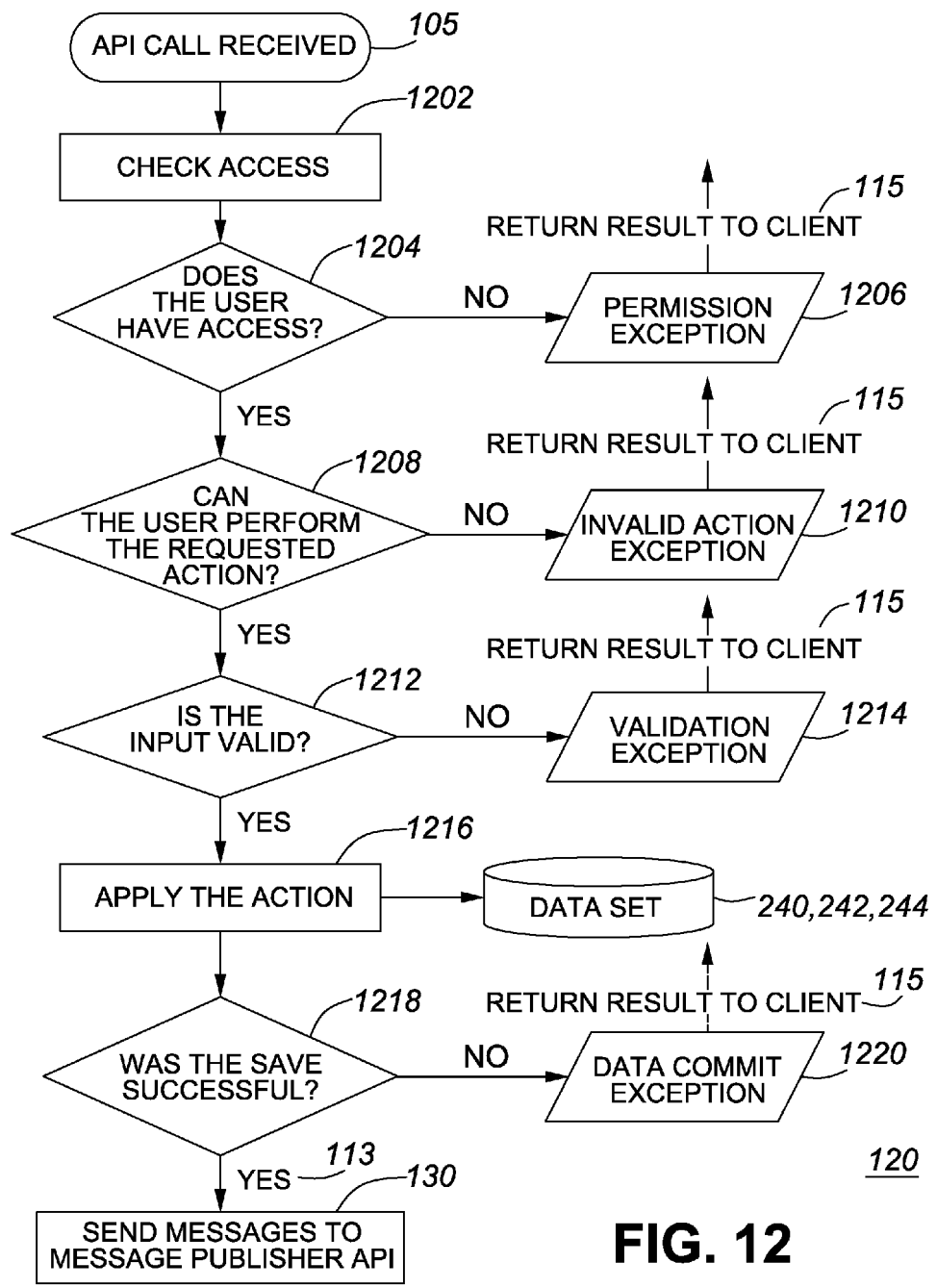
FIG. 12 shows, in flowchart form, an example method in accordance with implementations of the present disclosure.

FIG. 12 illustrates an example server application method 120 for receiving and implementing an action requested by a client device 101. After an action is received 105, a check is performed 1202, such as by the permissions module 232, to retrieve the access permissions associated with the client device 101 that submitted the action. A determination is made 1204 whether the client device 101 that requested the action has permission to request an action in the session and to access the dataset. If the client device 101 does not have permission to access the session or session dataset, an error such as a "permission exception" is generated 1206 and an error result is returned 115 to the client device 101.

If the client device 101 has permission to access the session, the server 110 determines 1208 whether the action requested by the client device 101 can be performed based on the permissions associated with the client device 101, the status of the session and the context. For example, in some embodiments, a client device 101 with user permissions may be prohibited from executing an action to create a session. An action to submit data elements 244 in a session may not be permitted if the status of the session is closed or locked. If the requested action cannot be performed by the client device 101, an error such as an "invalid action exception" is generated 1210 and an error result is returned 115 to the client device 101.

If the requested action can be performed by the client device 101, the server 110 determines 1212 whether the input or data submitted with the action is valid. If the input is valid, the server executes or applies the action 1216. If the input is not valid, an error such as a "validation exception" is generated 1214 and an error result is returned 115 to the client.

If the action can be performed and the input data is valid, the action is applied 1216 to a dataset, such as the session dataset 240, the topic data 242 or the idea dataset 245 including data elements 244, as identified by the context. As described above, the context provides a pointer to which dataset is being manipulated and the iteration number of the function. For example, if the gather data function is activated and a user device 101 requests an action to submit or modify a data element 244, the action is applied to add a data element or modify a data element 244. At 1218, the server 110 determines whether the action was performed successfully. If the action was successful 113, a message is generated to be published to the other user devices 101 or client devices 101 in the session. In some embodiments, a message is published according to message publishing method 130. If the action was not successful an error such as a "data commit exception" is generated 1220 and an error result is returned 115 to the client device 101.

Figure 13:
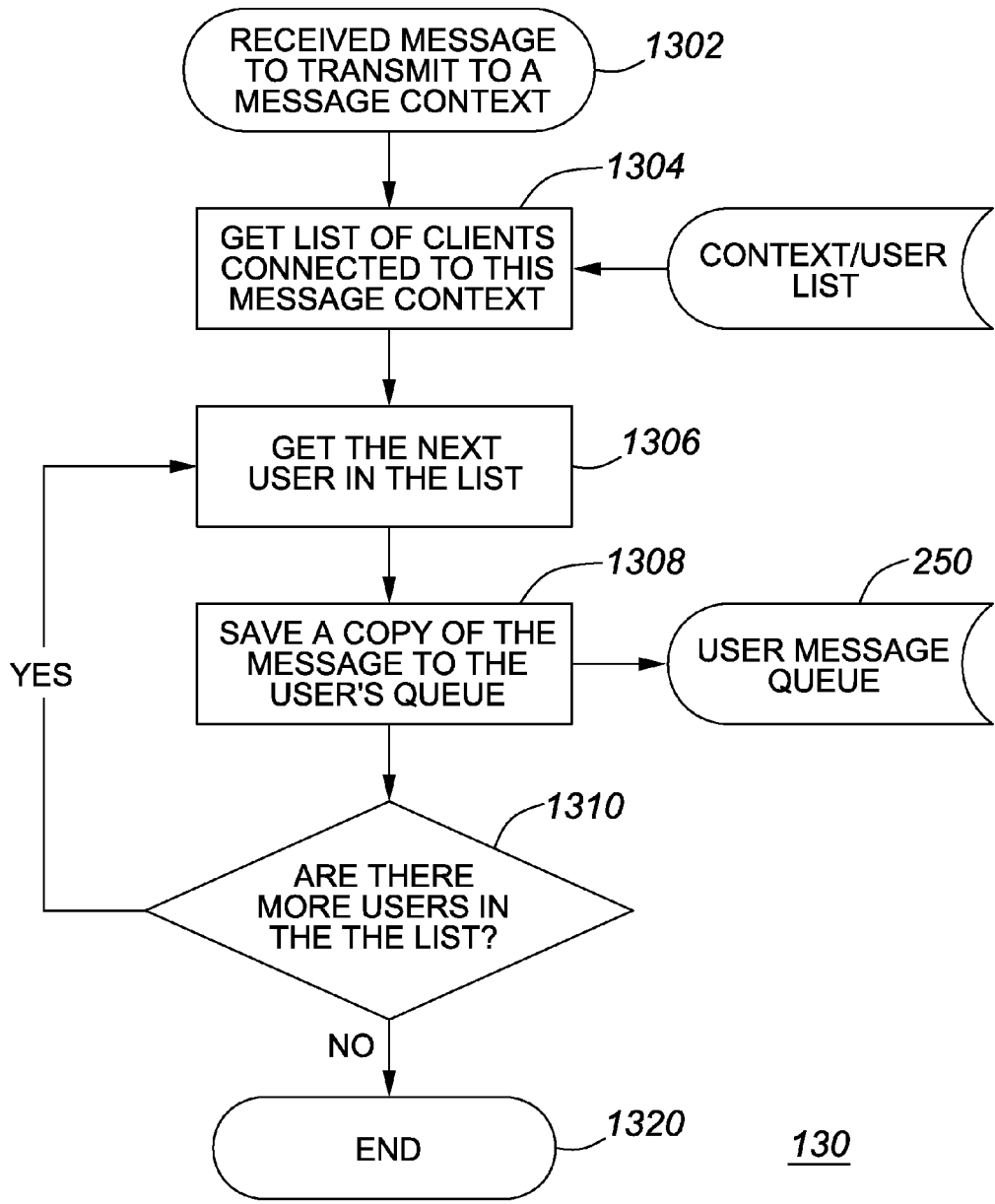
FIG. 13 shows, in flowchart form, an example method in accordance with implementations of the present disclosure.

FIG. 13 illustrates a message publishing method 130 according to an embodiment of the present disclosure. At 1302, a message is received such as a message from the server application method 120 for an action which was performed successfully by the server 110. At 1304, a list of one or more user devices 101 or client devices 101 associated with the message context are retrieved from the user list stored for that context in memory 204. The first or next user device 101 in the user list is determined 1306 and a copy of the message is saved 1308 in the message queue 250 in memory 204 for the user device 101. The server 110 determines if there are additional users device 101 1310 on the user list and if so, the next user device 101 is determined 1306 and a copy of the message is saved 1308 in the message queue 250 in memory 204 for that user device 101. The message publishing method 130 ends 1320 if there are no more user devices 101 in the user list.

Figure 14:
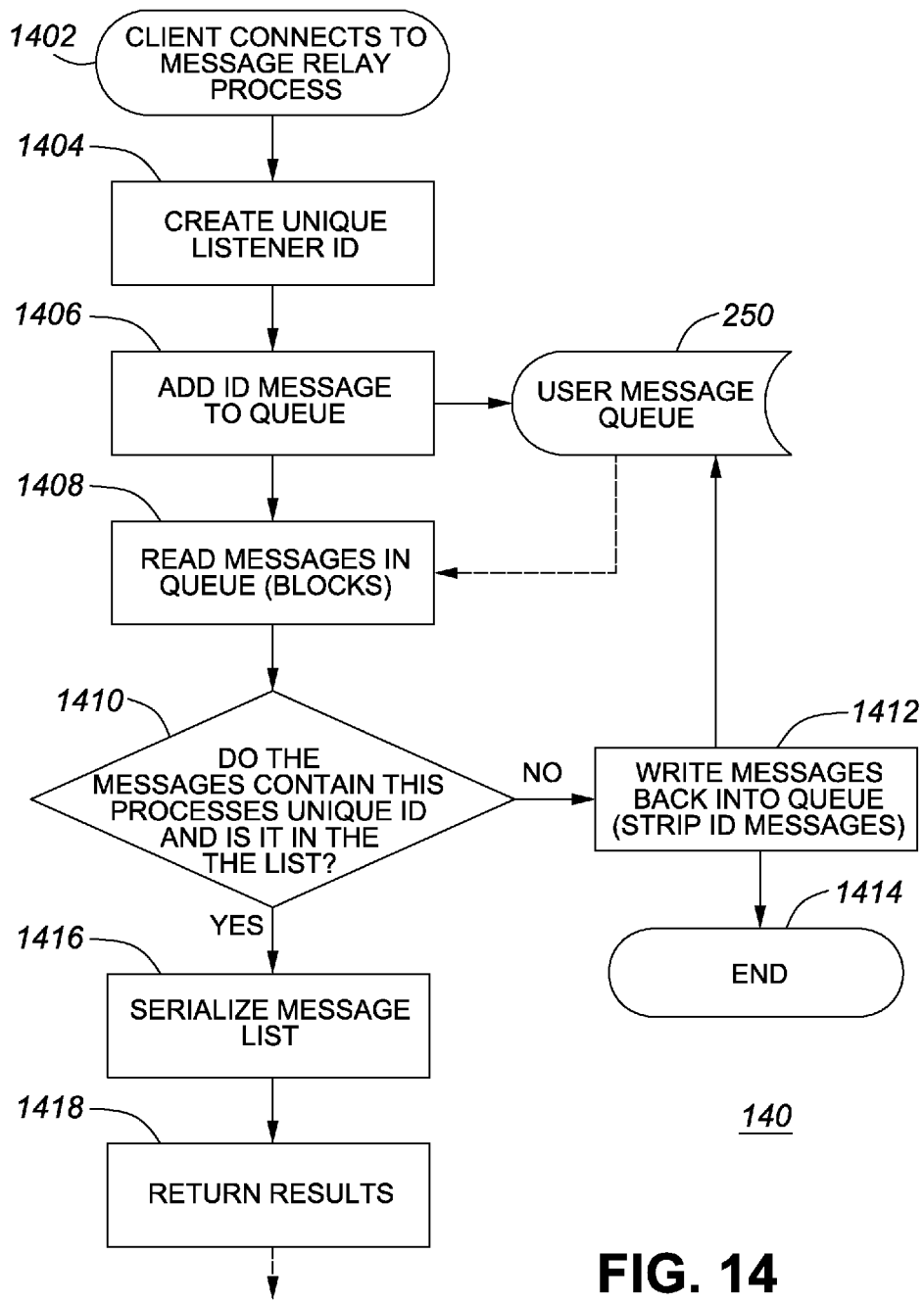
FIG. 14 shows, in flowchart form, an example method in accordance with implementations of the present disclosure.

FIG. 14 illustrates a message relay method 140 according to an embodiment of the present disclosure for transmitting messages saved in the message queues 250 to the user device 101 associated with each queue. The method 140 includes operations to ensure that a message is received by the correct user device 101 and that the user device 101 has permission to receive the message. While a user device 101 is connected 1402 to the system 10, the message relay method 140 is active to provide updates to the device 101. At 1404, a unique listener id is created and at 1406, a unique listener id message is added the user message queue 250. At 1408, messages in the queue for a device 101 are read. At 1410, a determination is made whether the messages contain the unique id to ensure that the message relay method 140 is operating in response to the most recent request, as indicated by the new unique id. If the unique ids of messages in the queue 250 do not match the unique id for the current method 140, all messages, excluding unique id other than the last or newest, are written back to the queue 1412 and the method 140 ends 1414. If the last unique id found in the queue matches the current unique id for the method 140, the messages are serialized 1416 and convert to a binary serialization formatted message. The resulting formatted messages are returned or transmitted 1418 from the server 110 to the user device 101. In some embodiments, when a user device 101 or client device 101 connects to the system 10, the message relay method 140 will return or transmit to the device 101 all currently queued messages. If there are no queued messages at the time, the method 140 waits until one or more messages arrived in the message queue 250 for a device 101.

Thus, as actions are requested by user devices 101 and the session dataset 240, topics 242 and data elements 244 are added, modified, or deleted, messages are published to user devices 101 in a session to provide a display of the current information stored in the datasets 240, 242, 245. The user devices 101 may be connected to a session and actively submitting actions and receiving messages from the server 110 in real time such as during a meeting or a web-conference or tele-conference call, or, one more user devices 101 may act independently and at different times to connect to the session, submit actions and receive messages from the server 110. In either example, users may be located in one physical place, such as a meeting room, or in various places or countries and connected to the system 10 and server 110 through devices 101. As functions are activated and actions implemented, the datasets are created and modified to provide an analyzed dataset as an output of the session.

In example embodiments, the server 110 supports the creation of a session as well as data collection functions, organizing functions and analysis functions and specifically, functions to: gather data, import data, categorize data, combine data, record tasks, generate and update reports, vote, evaluate and prioritize. Other functions and actions may be implemented to manage user accounts, track statistics of data gathering and analysis sessions and to enable users to view and manage one or more sessions.

Figure 15A:
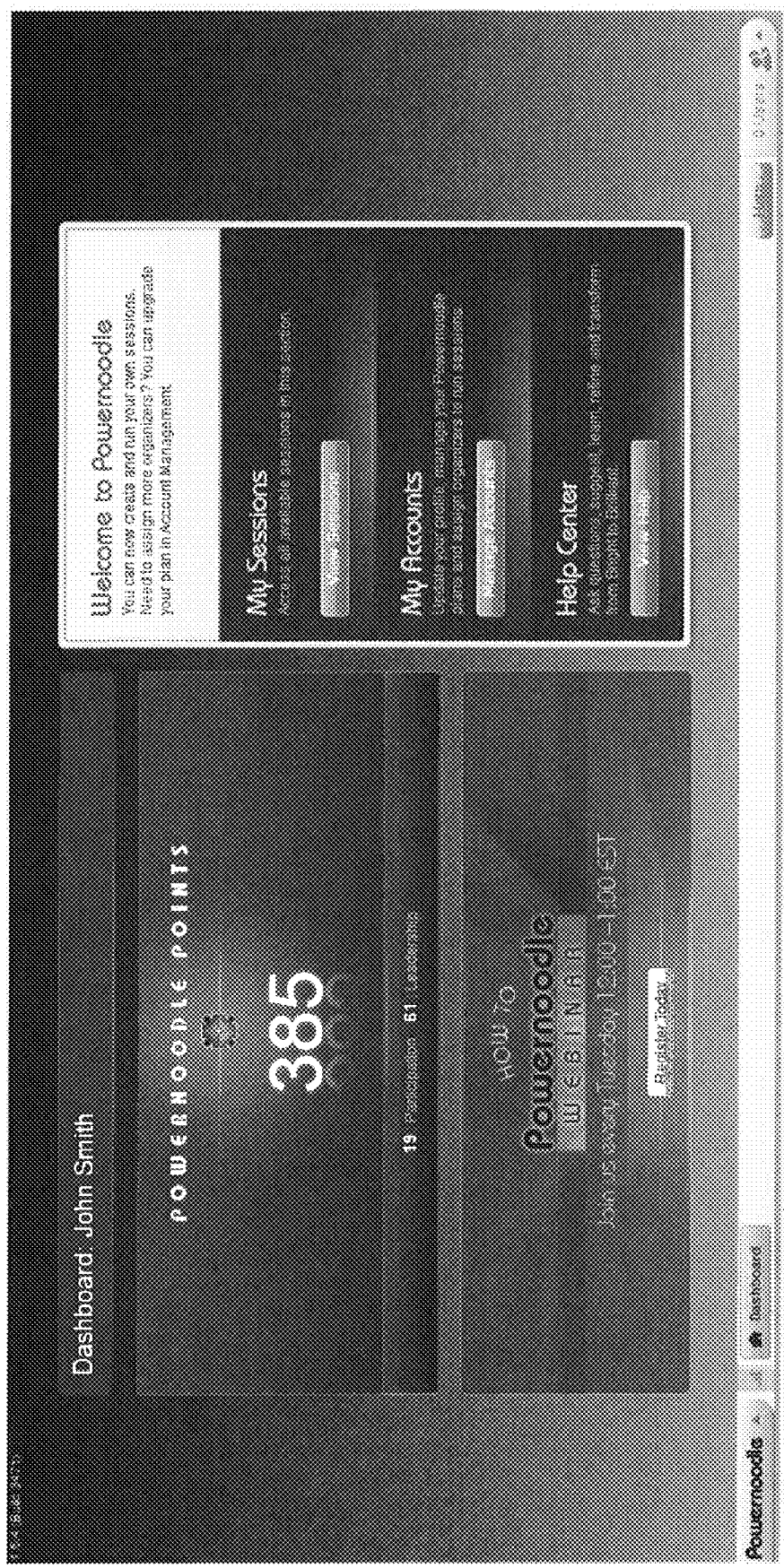
FIGS. 15(a) to (x) illustrate example screen shots of software application displays in accordance with one implementation of the present disclosure.

FIGS. 15(a) through (x) illustrate screen displays or portions of screen displays of example embodiments of the system 10 of the present disclosure including user interface elements generated by the server 110 for display on user devices 101 or client devices 101. In one embodiment, after a user account is created and a set of permissions are assigned to a user device 101, such as organizer or participant permissions, a main menu or "dashboard" 1501 transmitted by the server and displayed on an electronic device 101 as shown in FIG. 15(a). The dashboard 1501 may provide options for a user to manage the user account or to view and manage sessions.

In one embodiment, a session module 212 creates one or more sessions in response to received user requests. As illustrated in FIG. 15(b), a user device 101 may send an action to "Add session". If the user device 101 has the necessary permissions to create a session, the action is completed by the server 110 and the session information, including a session status, is displayed to the user device 101. In one embodiment, the user device 101 may configure the session to prevent participants from viewing information such as the numbers and identities of the other participants in the session.

The session module 212 also controls the status of a session in response to received user commands. In some embodiments, a session may have a status of active, read-only, closed, locked and archived. An active status indicates that a session is ongoing and actions may be taken by participants. A request to change a session status to read-only status may be received and executed in response to a request from a device 101 with organizer permissions to prevent further modifications to the topics 242, idea dataset 245 or the data elements 244 within a session. A session which is closed can no longer be accessed by participants. A session which is locked cannot be read by participants. A session which is complete or no longer required may be archived in response to a request from a device 101 with organizer permissions. An archived session and the datasets associated with the session are stored by the server 110. In one embodiment, the organizer but not the participants have permissions to change the session status and the status of functions taken within a session.

A session may be selected through a user interface and information may be added to the session dataset 240, or the session dataset 240 may be modified in response to requests by user devices 101. For example, as shown in FIGS. 15(b), (c), (d), (e), a session name and other information such as an agenda and list of session participants may be received from a user device 101 and stored as part of the session dataset 240. The agenda information may include a time and place for conducting a session in a physical environment; a time, instructions and connection information for conducting a session in a virtual environment such as through a teleconference or web-conference meeting; or information regarding a time frame for completing one or more functions in the session. In some embodiments, the data collection module 214 provides a function to import data in response to a received user command to upload a file or "add file" to the session dataset 240 in memory 204. The server 110 receives and stores one or more links such as an Internet URL address as part of the session dataset 240. In some embodiments, the server 110 and session module 212 support a contact directory (not shown) for receiving and storing one or more records of names and contact information, such as an email address.

In one embodiment, the session module 212 supports messaging functions. Once one or more participants are identified and selected by a user device 101 for a session, upon receipt of a user command to "send invitations", the session module 212 generates and sends an email message including session information, such as a session agenda, to the one or more session participants. In other embodiments, information and invitations regarding a session may be provided to participants through other communications means and systems. The session module 212 also may receive and send communications, such as email messages from participants to a session organizer. In another embodiment, communications may be supported by the session module 212 and server 110 between the participants in a session, including the session organizer and the option to support such communications may be configured for a session by the session organizer.

As illustrated in FIG. 15(c), one or more topics 242, shown as "questions", may be created and stored in memory 204 in response to a request received from a device 101 with organizer permissions. The topics 242 are associated with a session dataset. Each topic 242 may be deleted, modified or locked. A topic 242 may be selected and an "enter" command received from a device 101 in order to initiate a session in relation to the selected topic 242. A topic 242 may be locked in response to a request from an organizer device 101 in order to prevent participants from accessing the topic 242 prior to a scheduled time or before completing other actions requested by the organizer device 101 or a topic 242 may be set with a read-only status to prevent modifications to a session which has been completed or partially completed for the topic 242. In one embodiment, data elements 244 may be displayed to devices 101 with permissions as participants but devices 101 may not modify the data elements 244 stored in association with a read-only topic 242.

Figure 15:
Figure 15D:
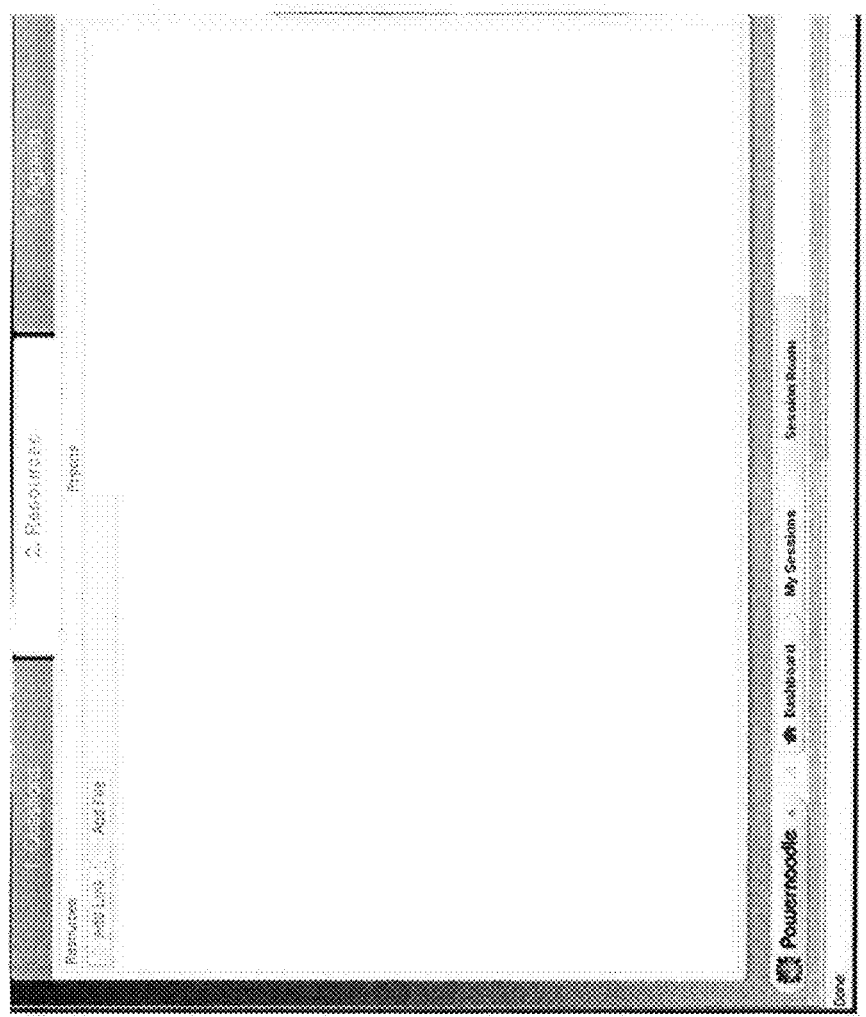
Figure 15E:
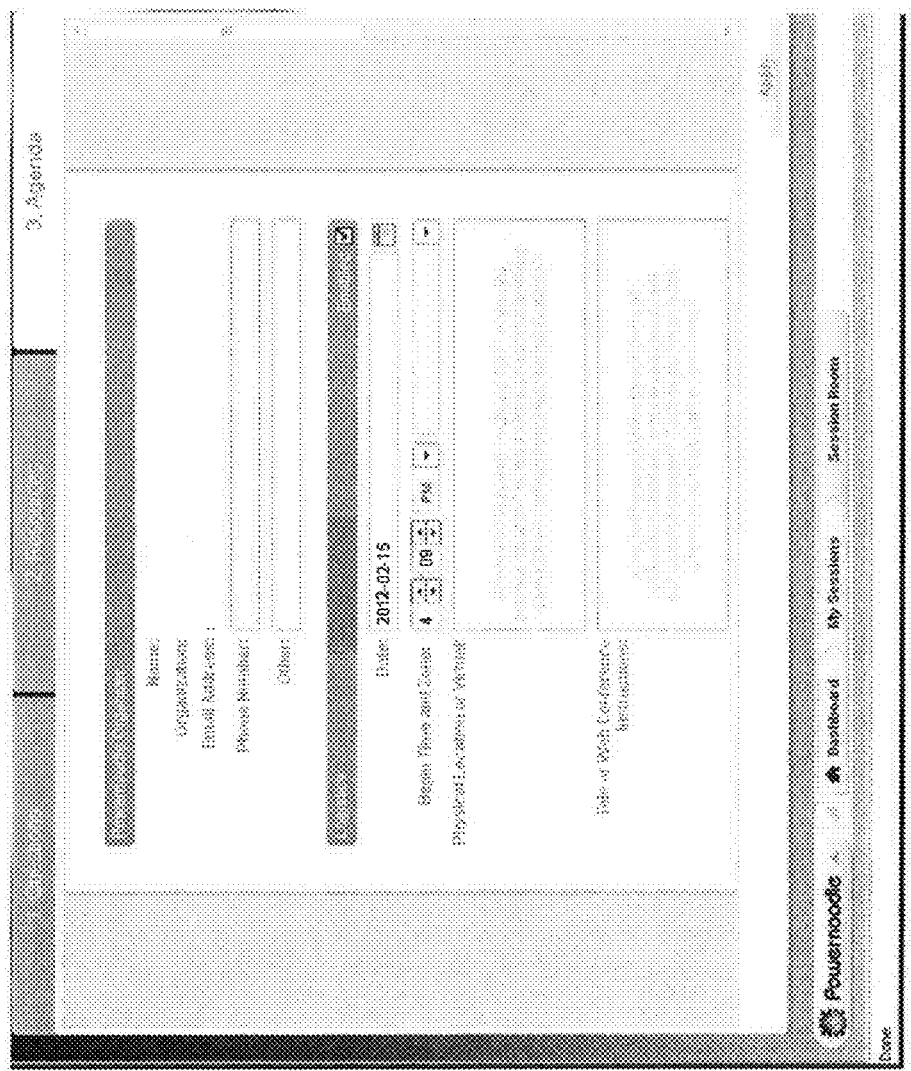
Figure 15G:
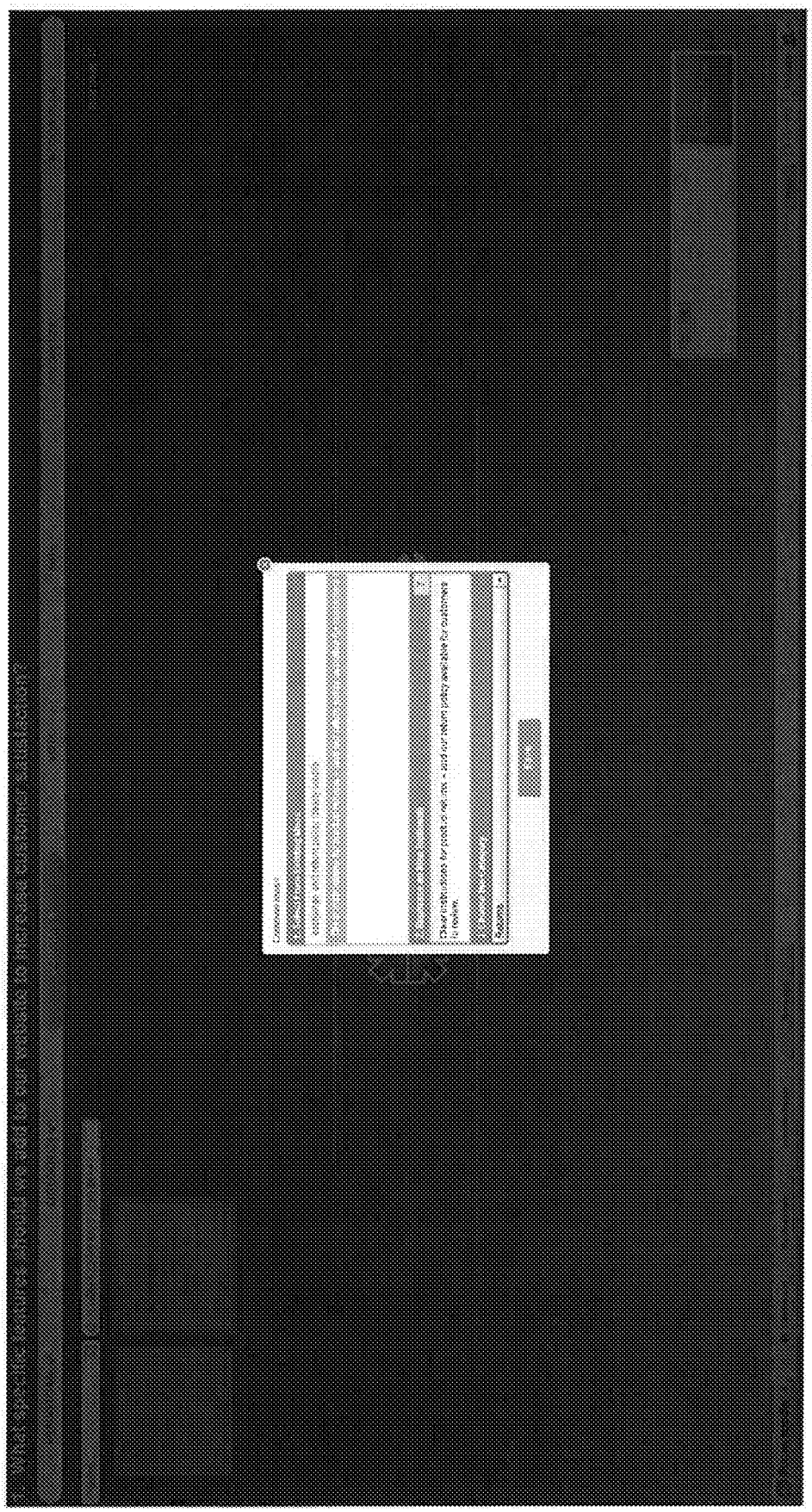
Figure 15A:
Figure 15I:
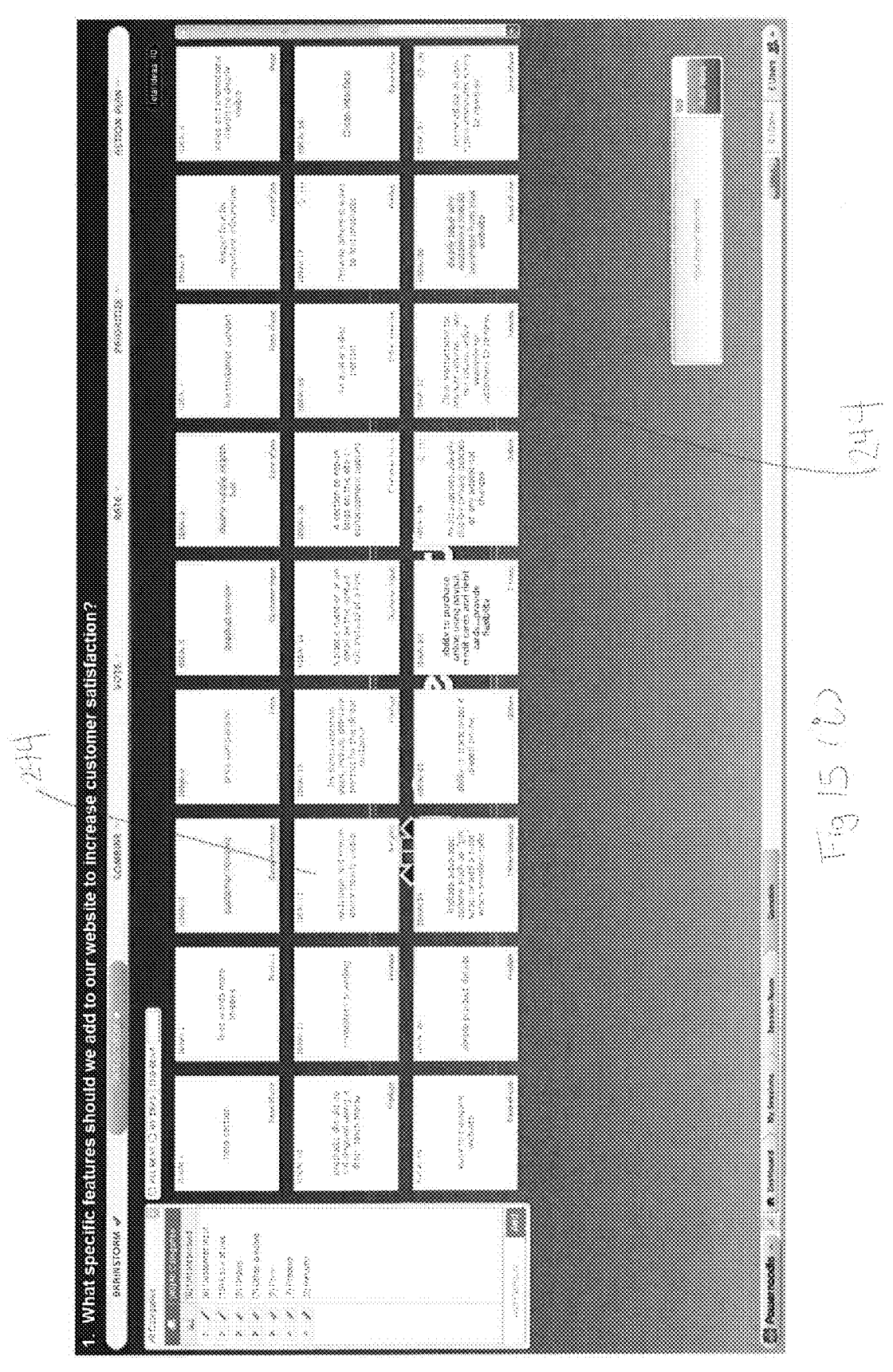
Figure 15K:
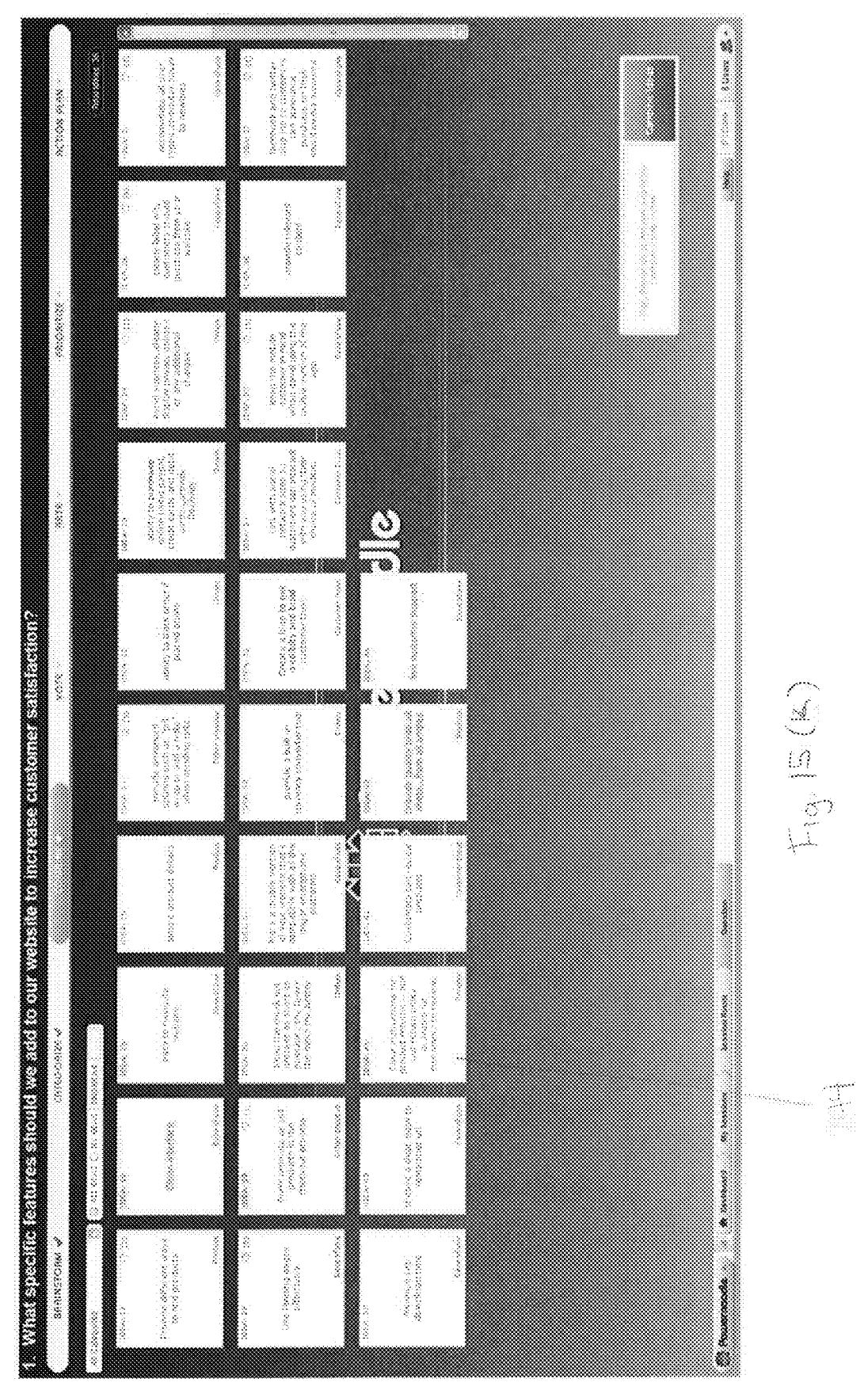
Figure 15N:
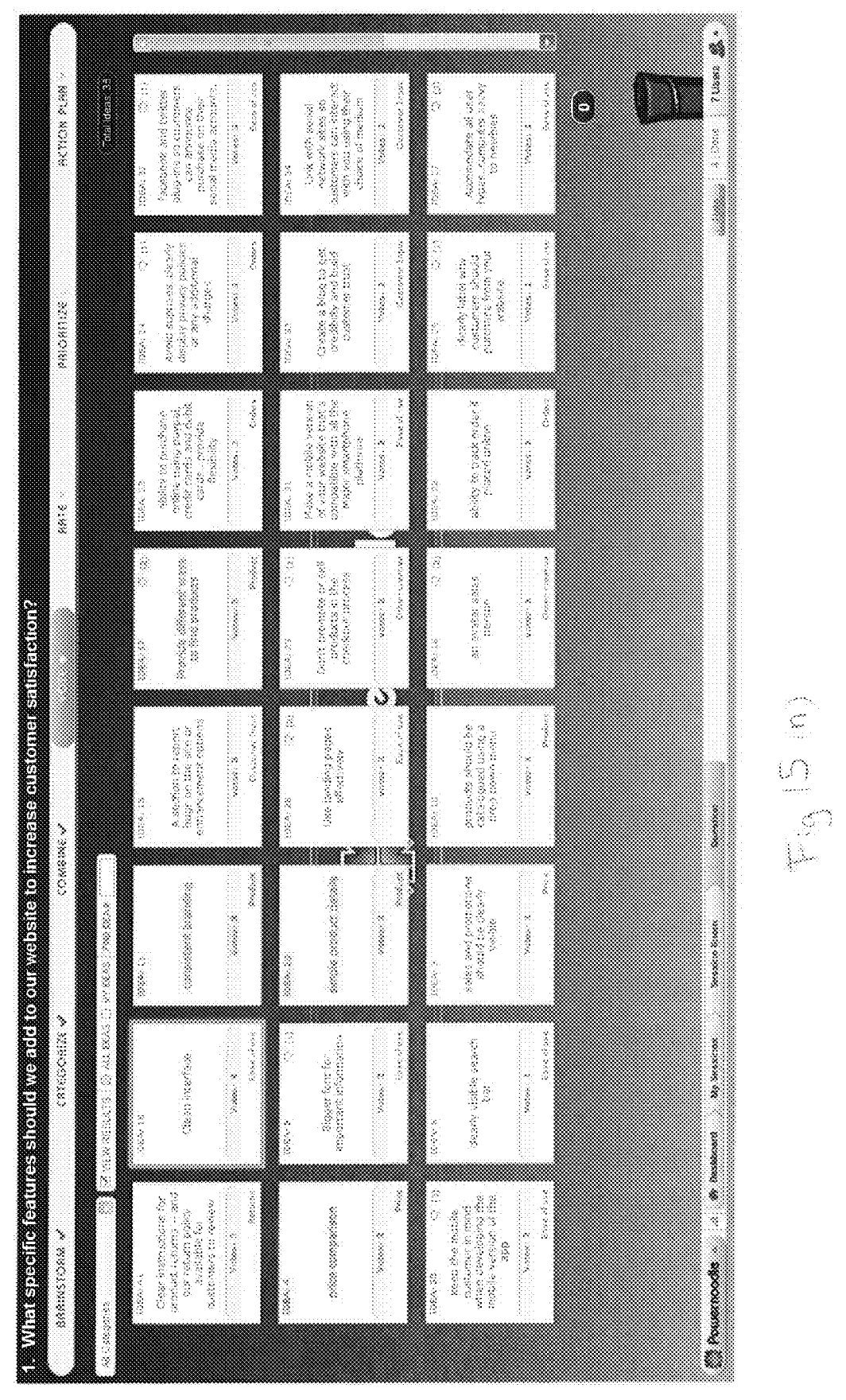
Figure 15:
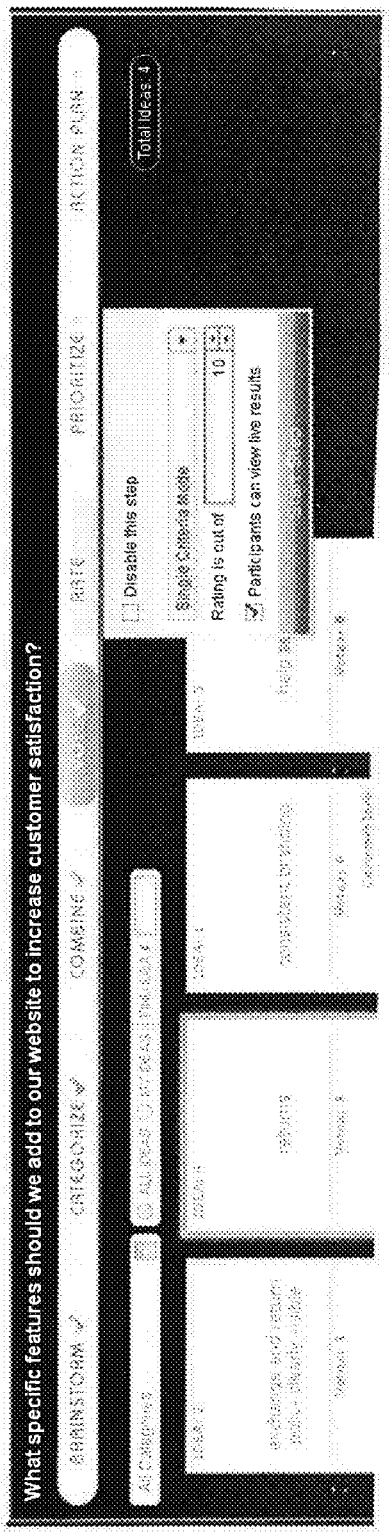
Figure 15:
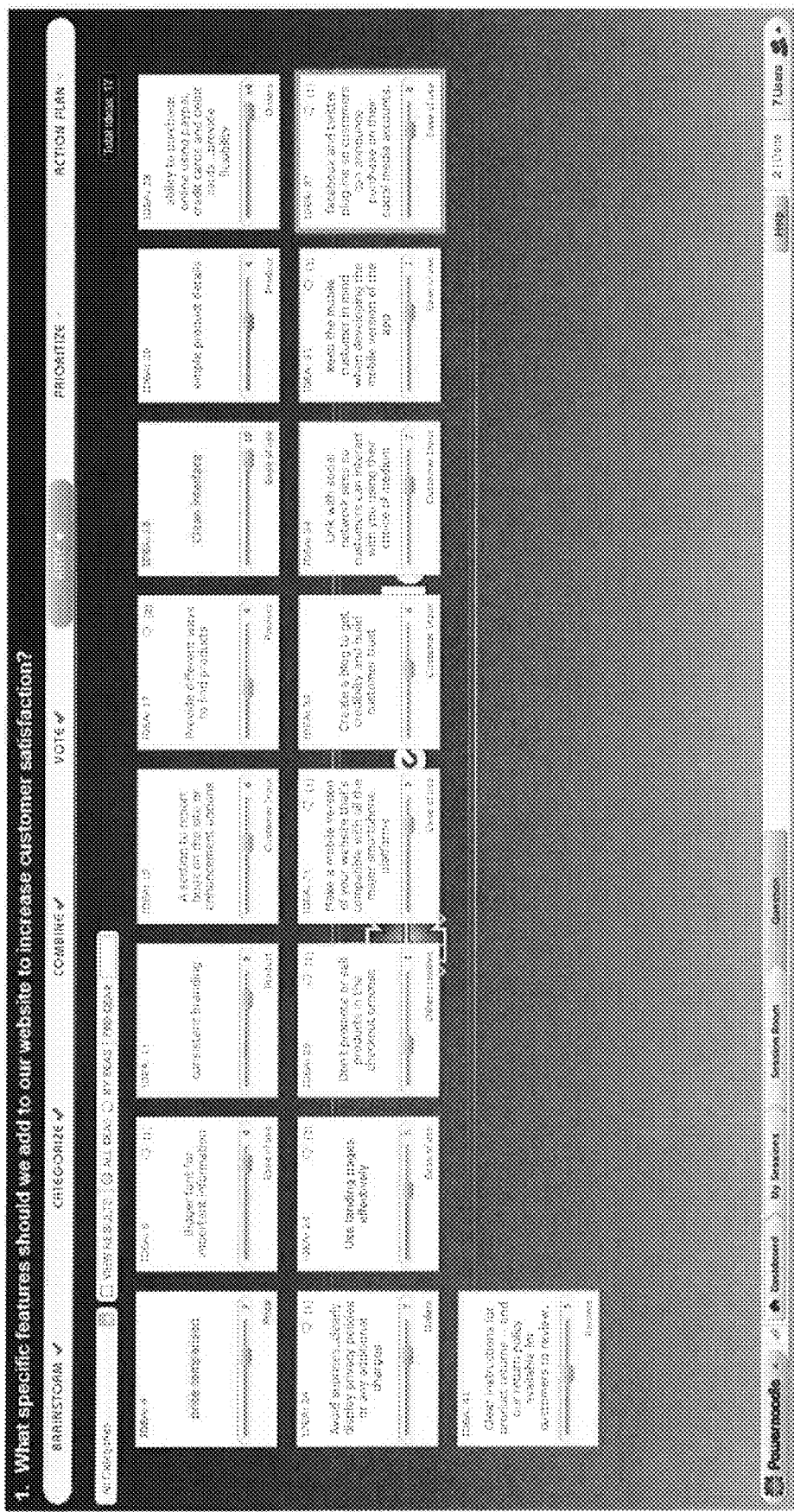

As illustrated in FIG. 15(*f*), once a session has been configured and initiated for a topic 242, such as the topic 242 "What specific features should we add to our website to increase customer satisfaction?" one or more functions are displayed to devices 101 and may be selected and activated by a user device 101, such as an organizer device 101. The functions to gather data or "brainstorm" and to categorize, combine, vote, rate, prioritize and create an action plan are displayed in one order in FIG. 15(*f*) but as described above, the functions may be selected and activated in any order.

Once a request is received from an organizer device 101 to select or configure a function and the server 110 has implemented the action to select the function, as described above, a user interface may be provided with a prompt to configure parameters or rules for the participants and the selected function. Once configuration information, if any, has been submitted by an organizer device 101, a command to "start" or activate the function may be selected. An organizer device 101 also may submit commands to stop or reset the function. Example embodiments are described below with respect to functions selected and activated for one topic 242 but functions also may be selected and activated concurrently for other topics 242 in a session. For example, functions to gather data or "brainstorm" may be selected and activated for three different topics 242 at the same time in order to prompt participants to submit data elements 244 with ideas in respect of each topic 242.

In one embodiment, as illustrated in FIG. 15(*f*), the data collection module 214 implements actions to accept and store data in association with a session and gather data or "brainstorm" function. The gather data function may provide a prompt to the user interface of participant devices 101 for participants to submit one or more data elements 244, such as ideas or answers, in relation to the session topic 242. A command prompt or window 1503 may be displayed on the electronic device 101 of a participant to provide a user input for creating and submitting a data element 244. As noted above, the user designated as the organizer also may participate in a session and submit ideas. Information sent by devices 101 may be stored in memory 204 as data elements 244 in association with the topic 242. In some embodiments, data elements 244 are displayed to user devices 101 graphically such as a note as shown in FIG. 15(*f*) or as a folder or other display graphic.

The gather data function may be first chosen and configured in response to a command received from the organizer device and the gather data function may be started or activated in response to a command received from the organizer device 101 at an appropriate time. After the gather data function is chosen, a user interface of the organizer device 101 may be provided with a prompt such as a window or menu (not shown) with one or more options to set parameters for the function such as whether the server 110 allows participant devices 101 to view data elements 244 submitted by other participant devices 101 or whether participant devices 101 may view only data elements submitted by the participant device 101. In one embodiment, the data collection module 214 displays data elements 244 to all participant devices 101 and receives and stores additional data or comments submitted by participants in respect of a data element 244. In one embodiment, data elements 244 are created and displayed on an "anonymous" basis such that the participant device 101 and associated user that submitted the data element 244 is not identified to other participant devices 101. In this embodiment, data elements 244 may be attributed to a participant device 101 and associated user by the system 10 but the attribution is not displayed to other participant devices 101. As described above, if an action is requested to modify a dataset, such as an action requested by a participant device to add a new data element 244, a message is published to other user devices in the session once the action is completed to display the new data element 244 on the display screen of the electronic devices 101 of users in the session. In one embodiment, if the organizer has configured the gather data function such that a participant only may view data elements 244 that the participant has submitted, the message publisher 230 would publish a message and display the new data element 244 only to that participant device 101 and to the organizer device 101.

The gather data function may be activated and completed in real time with participants in a meeting or conference call or the gather data function may be completed over a period of time to accept and store data elements 244 from participant devices 101 at different times. In either case, the gather data function may be performed by the server 110 to receive data elements 244 over the communications network 100 from users and electronic devices 101 in the same or different locations. In one embodiment, a participant device 101 may send a command or input (not shown) to indicate that the participant has completed the required actions for the gather data function or does not require further time for such actions. An organizer device 101 may send a request to complete or stop the gather data function after a predetermined time period, after indications have been received from all participant devices 101 that the required actions have been completed, or at the organizer's discretion, such as after sufficient data elements 244 have been received. An organizer may select a command or option (not shown) on the user interface of the organizer device 101 to stop or reset the function.

In some embodiments, the categorize module 216 supports a function to assign the data elements 244 associated with a topic 242 to one or more categories. Once a request is received from an organizer device 101 to select the categorize function, a user interface of the organizer device 101 may be provided with a prompt to configure one or more parameters for the function as illustrated in FIG. 15(*g*). In some embodiments, the organizer may configure the categorize function to enable participants to categorize all data elements 244, only the data elements 244 that a participant has submitted or no data elements 244. In the last case, the categorize function is performed by the organizer. A "start step" command may be submitted by the organizer to activate the categorize function. The parameters selected and transmitted by the organizer device 101 are used by the server 110 to determine whether an action requested by a participant device is permitted and can be completed. The organizer may define and submit one or more categories as shown on the left in FIG. 15(*i*). A data element 244 may be associated with a category, for example, by a user dragging and dropping the display of the data element 244 into a category display element. One or more data elements 244 may be assigned to a category but not all data elements 244 are required to be assigned to a category if the categorize function is activated. In some embodiments, data elements 244 may be displayed to participant devices 101 on the basis, for example, of displaying only all data elements 244 in a selected category, all data elements 244 in any category or all uncategorized data elements 244. In some embodiments, other actions such as an action to "add idea" to create a new data element 244 are permitted in the categorize function.

The categorize function may be activated and completed in real time with participants in a meeting or conference call or the categorize function may be completed over a period of time. In either case, the categorize function may be performed by the server 110 by accepting commands over the communications network 100 from users and electronic devices 101 in the same or different locations to assign a data element 244 to a category defined by the organizer and to update the data elements 244 accordingly. In one embodiment, a participant device 101 may send a command or input (not shown) to indicate that the participant has completed the required actions for the categorize function or does not require further time for such actions. An organizer device 101 may send a request to complete or stop the categorize function after a predetermined time period, after indications have been received from all participant devices 101 that the required actions have been completed, or at the organizer's discretion, such as after sufficient data elements 244 have been categorized. As illustrated in FIG. 15(h), an organizer may select a command on the user interface of the organizer device 101 to stop and complete the function or reset the function.

In some embodiments, the combine module 218 supports a function to combine one or more data elements 244 associated with a topic 242 into a single new data element 244. Once an organizer device 101 submits a command to select the combine function, a prompt such as a window or menu (not shown) with one or more options may be displayed on a user interface of the organizer device 101 to prompt the organizer to enter parameters for the function. In one embodiment, only the organizer device 101 is assigned permission to combine data elements 244. The organizer may select one or more data elements 244 to be combined. For example, where two data elements 244X, 244Y submitted by participants contain the same information or idea or the same information with different wording, an organizer device may submit a request to select the two data elements 244X, 244Y and combine these to create a new data element 244Z. If categories have been defined from a categorize data function, the data element 244Z also may be assigned to a category. For example, as illustrated in FIG. 15(i) separate data elements 244 contain the information "exchange and return policy clearly visible", labelled in the Figure as IDEA 12, and "clear instructions for product returns . . . " labelled in the Figure as IDEA 25. As illustrated in FIG. 15(j), a new data element 244 may be created to represent IDEA 12 and IDEA 25 and an organizer may enter new text and a category for the new data element 244. As illustrated in FIG. 15(k), a new data element 244 is displayed as IDEA 41 and the former data elements (IDEA 12, IDEA 25) are removed from the display.

The combine function may be activated and completed in real time with participants in a meeting or conference call or the combine function may be completed over a period of time. In either case, the combine function may be performed by the server 110 by accepting commands over the communications network 100 from users and electronic devices 101 in the same or different locations to combine one or more data elements 244 and to update the data elements 244 accordingly. In one embodiment, a participant device 101 may send a command or input (not shown) to indicate that the participant has completed the required actions for the combine function or does not require further time for such actions. An organizer device 101 may send a request to complete or stop the combine function after a predetermined time period, after indications have been received from all participant devices 101 that the required actions have been completed, or at the organizer's discretion, such as after sufficient data elements 244 have been combined. An organizer may select a command or option (not shown) on the user interface of the organizer device 101 to stop or reset the combine function.

In some embodiments, the vote module 220 supports a function to enabling voting in respect of the one or more data elements 244 associated with a topic 242. Once an organizer device 101 submits a request to select the vote function, the organizer may configure the number of votes allotted to each participant device 101 as illustrated in FIG. 15(l). The organizer also may configure options to control whether or not information regarding voting results is displayed to participant devices 101 while the voting function is being performed so as to display votes entered by other participants. The "live results" option shown in FIG. 15(l) refers to votes entered by participants while the vote function is activated and includes votes submitted by participants during a scheduled meeting or across a period of time. In some embodiments, a participant device 101 may assign only one vote to a data element 244.

FIG. 15(m) illustrates the vote function and votes being assigned to one or more data elements 244, in this example, IDEA 8, 11, 17, 18 24 and 29. The vote function may be activated and completed in real time with participants in a meeting or conference call or the vote function may be completed over a period of time. In either case, the vote function may be performed by the server 110 by accepting commands over the communications network 100 from users and electronic devices 101 in the same or different locations to assign allotted votes to data elements 244 and to update the data elements 244 accordingly. In one embodiment, a participant device 101 may send a command or input (not shown) to indicate that the participant has completed the required actions for the vote function or does not require further time for such actions. An organizer device 101 may send a request to complete or stop the vote function after a predetermined time period, after indications have been received from all participant devices 101 that the required actions have been completed, or at the organizer's discretion, such as after sufficient time has elapsed or after a sufficient number of participants have completed the actions for the vote function. An organizer may select a command or option (not shown) on the user interface of the organizer device 101 to stop or reset the function.

FIG. 15(n) illustrates the display of data elements 244 and results after the vote function has been completed. A total number of votes received for each data element 244 may be displayed in association with the data element 244. For example, a total of 5 votes were received by the server 110 and stored in association with data element 244 labelled as IDEA 41 in FIG. 15(n) and a total of 4 votes were received by the server 110 and stored in association with IDEA 18. In some embodiments, data elements 244 may be displayed to participant devices 101, for example, in the order of number of votes received. In some embodiments, once the vote actions have been completed by participant devices 101, an organizer device 101 may send a request to filter 502 or remove data elements 244 which received less than a predetermined number of votes from the display information provided to participant devices 101, as shown in FIG. 15(m). A filter may be applied, for example, to remove from the display all data elements 244 which received fewer than 2 votes. Thus, data elements 244 are analyzed and modified to reduce or remove less significant or less popular data elements 244.

In some embodiments, the rate module 222 supports a function to enabling rating in respect of the one or more data elements 244 associated with a topic 242. Once an organizer device 101 submits a request to select the rate function, the organizer device 101 may submit further information for the server 110 to configure the number, types and scales or ranges for ratings requested from participant devices 101 in respect of each data element 244. As illustrated in FIG. 15(p) the organizer may configure the rate function to request participants enter a single rating criteria for each data element 244. The rating may be received as a number between 1 and 10 or any other number range defined by the organizer device 101. An organizer device 101 may submit a request to select a "multiple criteria mode" for the rate function and a user interface of the organizer device 101 may be provided with a prompt or command window (not shown) to create and define one or more criteria and the rating scale for each criteria. The "live results" option shown in FIG. 15(p) refers to ratings sent by participant devices 101 while the rate function is activated and includes ratings sent by participant devices 101 during a scheduled meeting or across a period of time. Different ranges and thus different weights may be assigned to different criteria as determined by the organizer. The organizer device 101 also may submit a request to configure the rate function to hide or not display the rating ranges to participant devices 101. An organizer also may enter instructions to be communicated to participants to explain the ratings requested.

Figure 15R:
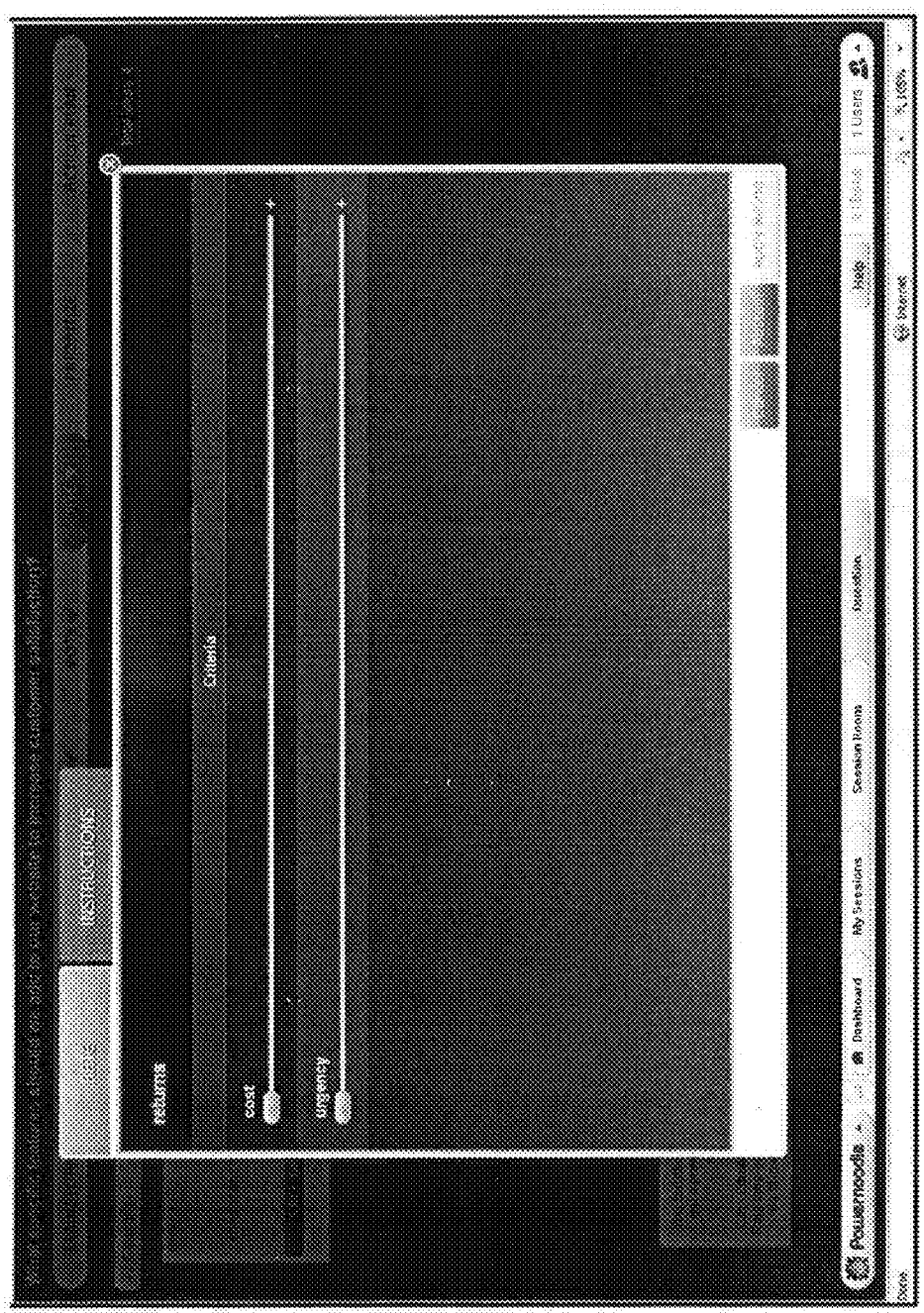
Figure 15S:
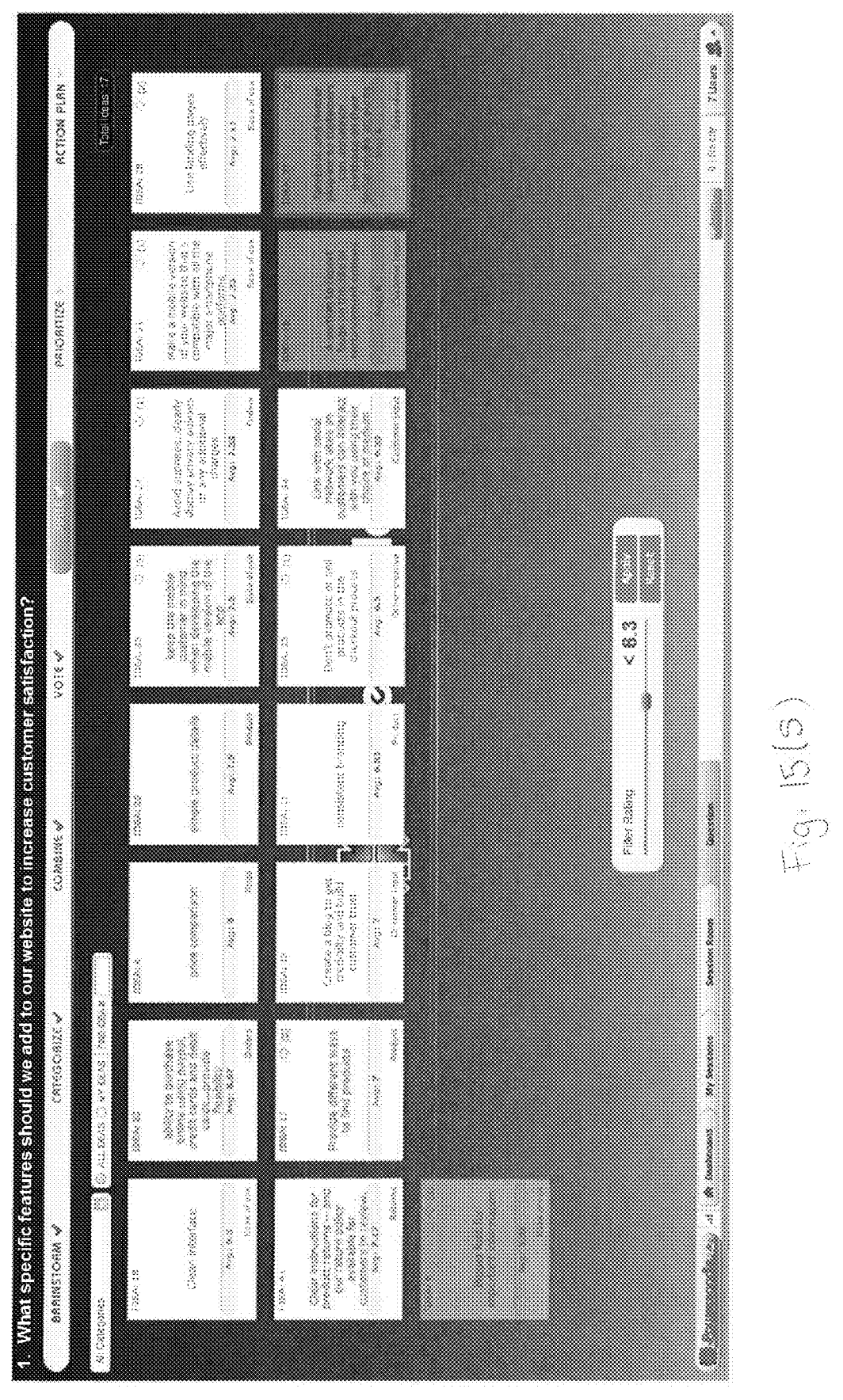
Figure 15:
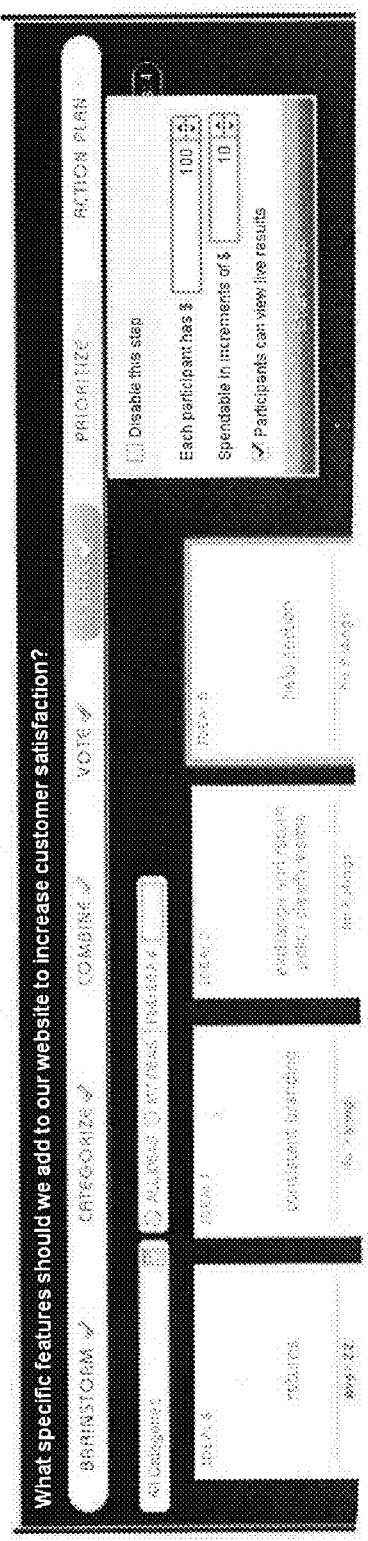
Figure 15U:
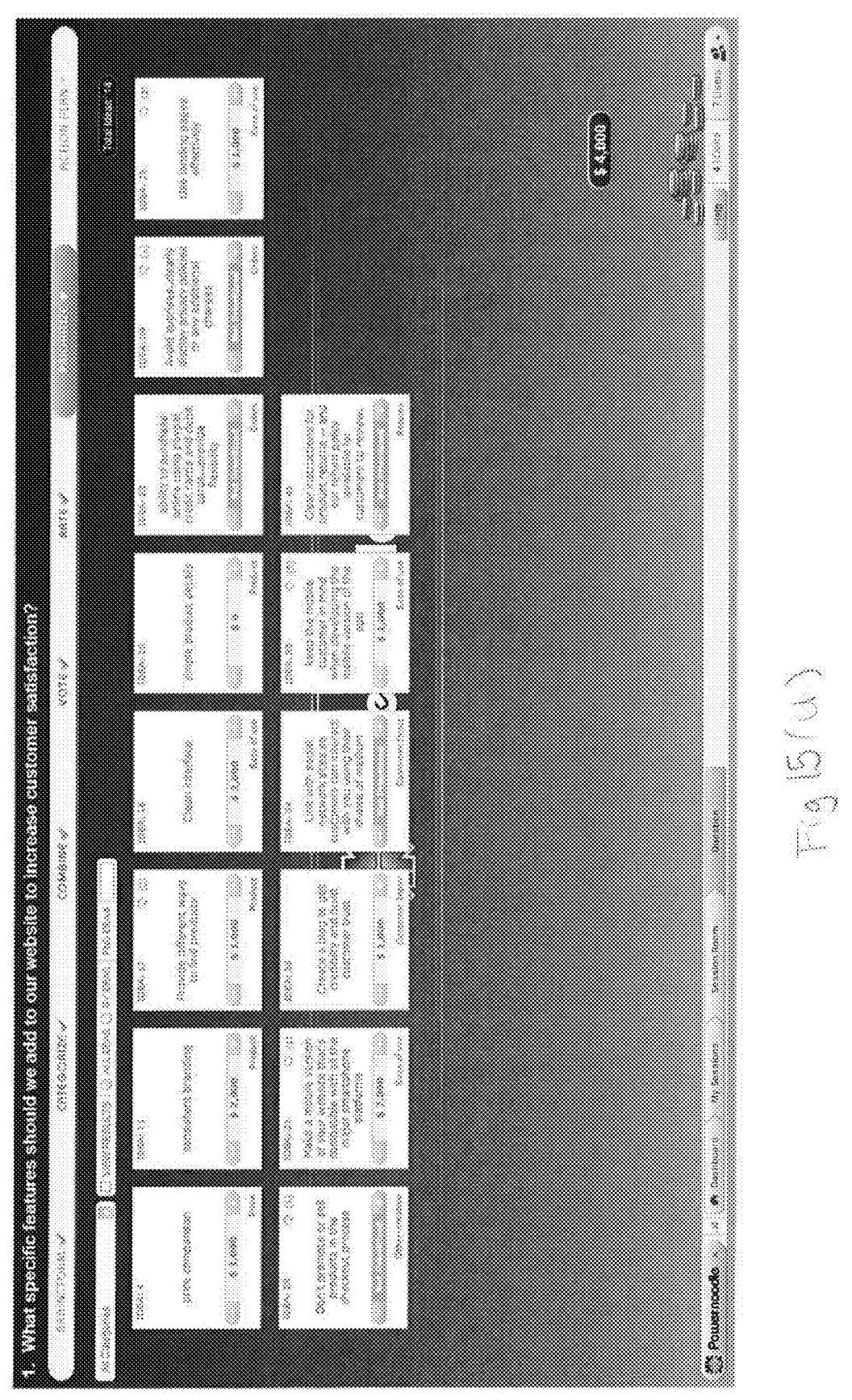
Figure 15W:
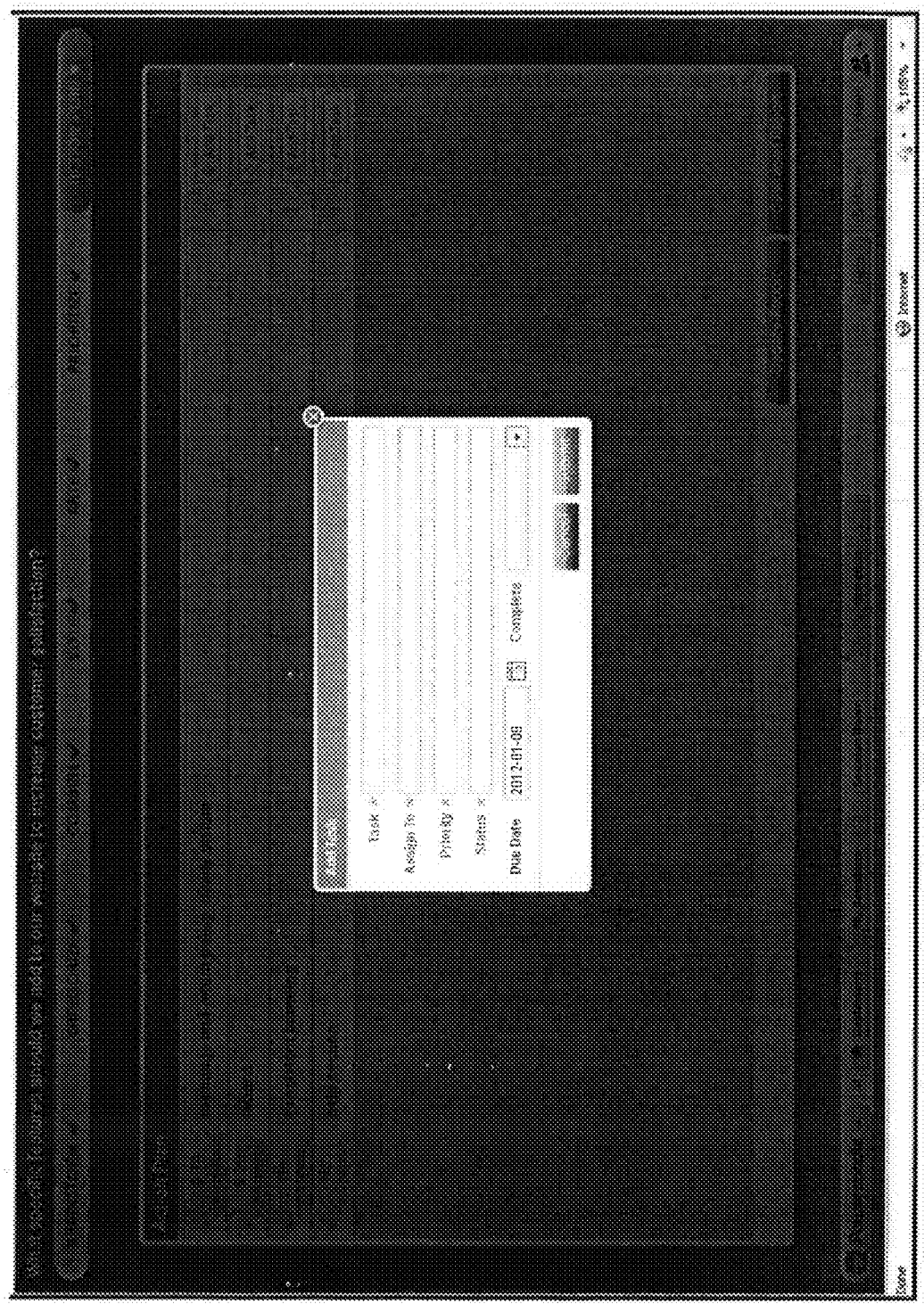
Figure 15X:
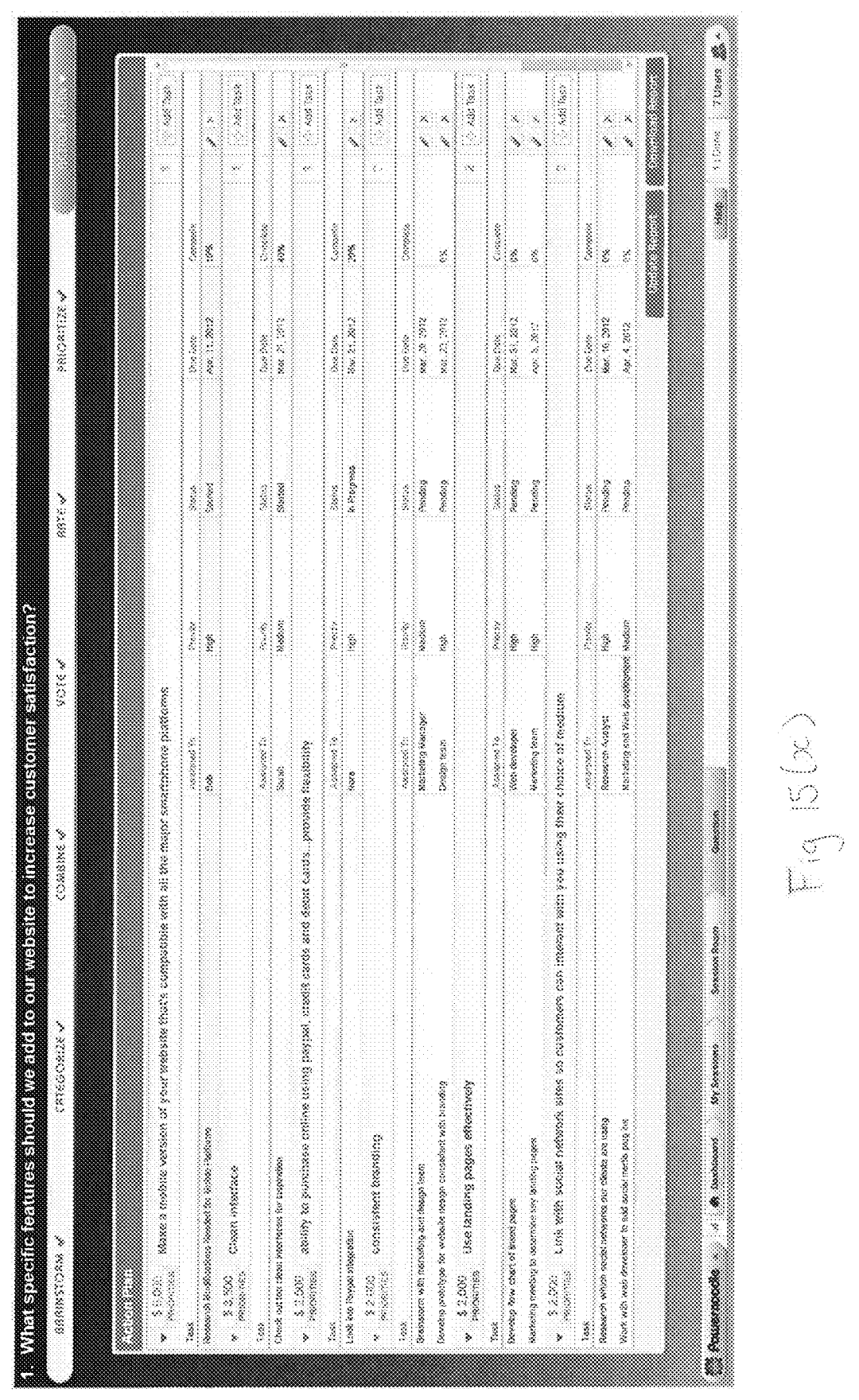

If a single rate criteria is configured, once the rate function is activated, participant devices 101 may submit a rating for each of the data elements 244, as illustrated in FIG. 15(q). A user may submit a request such as by clicking and sliding a display bar on a user interface of the user device 101 for each element to select a rating, such as a number between 1 and 10. In the example shown in FIG. 15(r), multiple rate criteria have been configured. A participant device may receive and send to the server one or more rating criteria for each data element 244 for the criteria requested. A participant also may abstain from rating one or more data elements 244 or from applying ratings for one of multiple criteria selected.

The rate function may be activated and completed in real time with participants in a meeting or conference call or the rate function may be completed over a period of time. In either case, the rate function may be performed by the server 110 by accepting commands over the communications network 100 from users and electronic devices 101 in the same or different locations to assign ratings and to update the data elements 244 accordingly. In one embodiment, a participant device 101 may send a command or input (not shown) to indicate that the participant has completed the required actions for the rate function or does not require further time for such actions. An organizer device 101 may send a request to complete or stop the rate function after a predetermined time period, after indications have been received from all participant devices 101 that the required actions have been completed, or at the organizer's discretion, such as after sufficient time has elapsed or after a sufficient number of participants have completed the actions for the rate function. An organizer may select a command or option (not shown) on the user interface of the organizer device 101 to stop or reset the rate function.

In some embodiments, once the rate actions have been completed by participants, average ratings may be displayed for each data element 244 on a user interface of user devices 101 as illustrated in FIG. 15(s). In some embodiments, data elements 244 may be displayed to participant devices 101 on the basis, for example, of the order of ratings received, such as from the highest rated element to the lowest. An organizer device 101 may receive and send a request to filter 502 or remove from the display data elements 244 which received less than a predetermined number or level of ratings from the display information provided to participant devices 101. A filter may be applied, for example, to remove from the display all data elements 244 which received a rating of less than 6.3. The ratings generated provide an indication of the importance or relevance of a data element 244 to the associated topic 242. Thus, data elements 244 are analyzed and modified to reduce or remove less important or less relevant data elements 244.

In some embodiments, the prioritize module 224 supports a function to enabling prioritizing of the data elements 244 associated with a topic 242. Once an organizer device 101 submits a request to select the prioritize function, the organizer device 101 submit further information for the server to configure parameters for participants to provide an analysis of the highest priority or most important data elements 244. In the example illustrated in FIG. 15(t), the organizer may configure a finite budget reflecting resources such as money, people or time, for each participant to distribute among the data elements 244. As illustrated in FIG. 15(t) the organizer device 101 also may provide information to configure the increments assigned by participant devices 101 and whether participant devices 101 may receive a display of the results of the prioritize function submitted by other participant devices 101. The "live results" option shown in FIG. 15(t) refers to priorities entered by participants while the prioritize function is activated and includes priorities submitted by participants during a scheduled meeting or across a period of time. As shown in FIG. 15(u), a participant device may assign increments of the allotted budget for the prioritize function by selecting a data element 244 and adding or subtract increments from the participant device 101 budget. An indication may be provided to the participant device 101 of the total budget remaining.

The prioritize function may be activated and completed in real time with participants in a meeting or conference call or the prioritize function may be completed over a period of time. In either case, the prioritize function may be performed by the server 110 by accepting commands over the communications network 100 from users and electronic devices 101 in the same or different locations to assign priorities to data elements 244 and to update the data elements 244 accordingly. In one embodiment, a participant device 101 may send a command or input (not shown) to indicate that the participant has completed the required actions for the prioritize function or does not require further time for such actions. An organizer device 101 may send a request to complete or stop the prioritize function after a predetermined time period, after indications have been received from all participant devices 101 that the required actions have been completed, or at the organizer's discretion, such as after sufficient time has elapsed or after a sufficient number of participants have completed the actions for the prioritize function. An organizer may select a command or option (not shown) on the user interface of the organizer device 101 to stop or reset the prioritize function.

In some embodiments, once the prioritize actions have been completed by participants, the total priorities or budget assigned by participants, and/or the average budgets assigned to each data element 244 may be displayed to the devices 101 in association with the data element 244. For example, data element 244 labelled as IDEA 31 in FIG. 15(v) is displayed with a total budget of $6,000. In some embodiments, data elements 244 may be displayed to participant devices 101 for example, in the order of assigned budgets. An organizer device 101 may implement actions to filter 502 or remove data elements 244 which received less than a predetermined number or level or amount of the budget assigned for the prioritize function as illustrated in FIG. 15(v). A filter may be applied, for example, to remove from the display of devices 101 all data elements 244 which received a budget of less than $1,129. The priorities indicated by the assigned budgets provide a further indication of the importance or relevance of a data element 244 to the associated topic 242. Thus, data elements 244 are analyzed and modified to reduce or remove less important or less relevant data elements 244.

In some embodiments, the organizer module 226 supports a function to create an "action plan" for one or more data elements 244 associated with a topic 242. Once an organizer submits a request to select the action plan function, a prompt such as a window or menu (not shown) with one or more options may be displayed on the organizer device 101. In some embodiments, once an organizer device 101 submits a request to activate the action plan function a display is provided by the server 110 to the devices 101 with each data element 244 which remains from the one or more previous gather, categorize, combine, vote, rate and prioritize functions displayed as an action item in an action plan. A user device 101 may select a data element 244 and submit one or more tasks or user action items to be saved by the server 101 in association with the data element 244. In some embodiments, a task may be assigned to a participant or to person not participating in the session and information such a priority, status, due date and level of completion may be recorded. As illustrated in FIG. 15(x), one or more tasks may be created and displayed to devices 101 for each data element 244. In some embodiments, both the organizer devices 101 and participant devices 101 may have permissions to create, edit and/or delete tasks.

A report module 228 may provide functions to generate or update and download a report from the session dataset 240, topic dataset 242 and idea dataset 245, including the tasks created and stored as part of the data elements 244. The updated report may be requested by and sent to the organizer device 101 and/or to participant devices 101. The report provides session users with an immediate and complete recording of the results of the data gathering and analysis session. A sample report is illustrated in FIGS. 16(a) and (b).

The functions to create an action plan or to generate a report may be implemented in any order and after the completion of any previous function such as gathering data, combining data or voting. Thus, the system 10 allows the generation of reports during interim steps in the session or following the completion of functions in any order, for example, to provide a list of ideas gathered by a brainstorm function prior to any combine or vote functions. While the session is active, participant devices 101 also may submit information and requests to edit the action plan to update the status of tasks. The server 110 may modify the datasets and generate new reports based on the updated datasets.

In some embodiments, statistics of actions requested by user devices 101 are created and stored in memory 204 by the system 10. Statistics may include a count of the number of sessions a user has participated in or organized. Points may be assigned to a user to reflect the success of the data elements 244 or ideas submitted by a user. In one embodiment, points are determined based on the number of votes, ratings and/or prioritizing budget assigned by other devices 101 to a user's ideas. Statistics and points may be displayed on a user device 101 as illustrated in FIG. 15(a).

In an example embodiment of a session conducted using the system 10 of the present disclosure, a business analyst may act as an organizer and invite participants to attend a face to face session at a specific time to define the requirements for a new software application. The organizer and each participant use an electronic device 101 for communicating with the server 110. The electronic devices 101 of the participants and organizer may be the same or different devices. Using the system 10, each participant in the room is invited into a session and the organizer may submit the first topic 242 as "What do we see as the business objectives for our new website?". The organizer submits a request from the device 101 to select the function to collect data elements 244 and provides information to the server 110 to set a parameter to allow participant devices to view data elements 244 collected from other participant devices. The organizer submits a request to activate the collect data function and the participants submit their ideas and comments in real time using devices 101 and the server 110 creates and stores multiple data elements 244 to store the submitted ideas in association with the topic 242. Participants may view the data elements 244 submitted by others but no display is provided of the user name that submitted a particular data element 244. The organizer can then choose to submit a request to initiate any other function and for example, the categorize function to categorize the submitted data elements 244. The organizer defines one or more categories and provides parameters for the server 110 to allow participant devices 101 to categorize the data elements 244 that the participant device 101 has submitted. Each user then submits actions to categorize the ideas or data elements 244 submitted by that user, and, in real time, as actions are completed successfully by the server 10, messages are published and pushed to user devices 101 to display the categorized data elements 244. The group then decides they would like to vote on which ideas or data elements 244 which are most important. The organizer submits a request to select and configure the vote function followed by a request to activate the vote. Once votes have been received from participant devices 101, the data elements 244 may be revised to remove one or more data elements 244 which received few or no votes and the data elements 244 are updated. The group dynamically decides to complete a second vote to select the ideas that will cost the least amount of money. The server 110 adds a second iteration of the vote detail to the dataset. The functions can continue to be added to the process dynamically based on how the group would like to explore the question. In this example, the functions are activated dynamically based on the natural flow of the requirements session. The session is held face to face and the organizer and participants are operating in the same place and time using electronic devices 101 to communicate with the server 110.

In another example embodiment of a session conducted using the system 10 of the present disclosure, a conference manager may act as an organizer of a session to request the analysis of selection committee of ten members located around the world to evaluate papers submitted to the conference and to recommend five papers to be presented at the conference. The titles of all of the submissions have been listed in a spreadsheet and this spreadsheet is sent by an organizer device 101 and imported and stored in the system 10 using the import data function to create a session data set 240. Prior to inviting participants, the organizer may submit a request to select a rate function and configure the function to set the business rules for the rating. The organizer then submits a request to the server 110 to activate the function. The ten members of the selection committee may live in different countries and are invited into the system 10 as participants to rate the various submissions. The participants may be requested to complete the rate functions over a two day period. The ten participants thus may enter the session asynchronously to complete their evaluations and submit information from participant devices 101. In this second example, the functions are selected, configured and activated in the system 10 on a preset and prescribed approach based on a known methodology or approach. The session is held with remote participants with the organizer and participants using the system 10 and electronic devices 101 and sending and receiving data from the server 110 in a different place and time Although the exemplary embodiments described herein employ the memory 204, other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, also may be used in the exemplary operating environment. Non-transitory computer-readable storage media expressly exclude media such as energy, carrier signals, electromagnetic waves and signals per se.

Thus, it is apparent that there has been provided in accordance with the embodiments of the present disclosure a data gathering and analysis system that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The invention claimed is:

1. A system for conducting a data gathering and analysis session over a communications network, comprising:
    a server configured to:
        receive commands and user data from one or more client devices;
        store one or more datasets from the received user data in a memory, each dataset comprising one or more data elements;
        transmit data to the one or more client devices;
        configure a plurality of functions in any order to modify one of the datasets, by dynamically adding one or more actions within each function while the function is activated and dynamically configuring one or more actions within each function, including the one or more added actions, to modify the one or more data elements;
        activate a configured function in any order to modify one of the datasets;
        perform one or more actions of an activated function;
        maintain a context indicating the dataset, and a list of users for a particular session, and
        prior to configuring one of the plurality of functions, adding one or more actions within each function, activating a configured function and performing an action, determine whether the configuring, adding, activating or performing is permitted within the context for the particular session and determine whether the user has permission to perform the configuring, adding, activating or performing.

2. A system according to claim 1 wherein the functions comprise functions to gather data elements, import data elements, categorize data elements, combine data elements, assign votes to data elements, assign ratings to data elements, prioritize data elements, record tasks in association with data elements and generate a report of data elements of the one or more datasets, and wherein the one or more actions comprise rules for manipulating the data elements, each action being configurable within multiple functions.

3. A system according to claim 1 wherein the server is configured to create a queue in memory for each user within the context for the particular session and wherein, in response to performing an action, the server is configured to generate and store a message in the memory queue for each user.

4. A system according to claim 3 wherein the server is further configured to transmit one or more stored messages from the memory queue to the client device of each user to provide a display of current information from the dataset for the particular session.

5. A system according to claim 1 wherein the server is further configured to:
    receive a user command to dynamically activate a configured function in an order different than the configured order of functions,
    determine whether the activation of the configured function is permitted within the context for the particular session and whether the user has permission to perform the activation of the configured function, and if permitted, activate the configured function.

6. A system according to claim 5 further comprising receiving a user command to perform an action of the activated function and wherein prior to performing the action, the server is configured to determine whether the action is permitted for the activated function within the context for the particular session and whether the user has permission to perform the action.

7. A system according to claim 1 further comprising at least one electronic device configured as a client device to transmit data and commands to the server and to receive data from the server through the communications network.

8. A system according to claim 7 wherein the at least one electronic device comprises one of a personal computer, a laptop computer, a mobile telephone, a smart phone or a personal digital assistant.

9. A system according to claim 1 wherein the server is further configured to, in response to user commands, configure the plurality of functions in a predetermined order and activate the configured functions in the predetermined order.

10. A system according to claim 1 wherein the server is further configured to, after configuring and activating one or more functions, receive user commands to dynamically configure and activate an additional instance of a particular function for the particular session, wherein the context further comprises an iteration number for each configured function.

11. A system according to claim 1 wherein the server is configured to configure one of the plurality of functions by configuring a data element in the dataset for the particular session representing the function.

12. A computer-implemented method for conducting a data gathering and analysis session among multiple users over a communications network, comprising,
    receiving commands and user data from one or more client devices;
    storing a dataset in memory from the received user data, the dataset comprising one or more data elements;
    configuring a plurality of computer implemented functions in any order to modify the dataset, by dynamically adding one or more actions within each function while the function is activated and dynamically configuring one or more actions within each function, including the one or more added actions, to modify the one or more data elements;
activating a configured function in any order to modify one of the datasets;
performing one or more actions of an activated function;
maintaining a context indicating the dataset and a list of users for a particular session; and
displaying the modified dataset to one or more users; and
wherein prior to configuring one of the plurality of functions, dynamically adding one or more actions within each function, activating a configured function and performing an action, determining whether the configuring, adding, activating or performing is permitted within the context for the particular session and determining whether the user has permission to perform the configuring, adding, activating or performing.

13. A method according to claim 12 further comprising creating a queue in memory for each user within the context for the particular session and after performing an action, storing a message in the memory queue for each user.

14. A method according to claim 13 further comprising transmitting one or more stored messages through the communications network to the one or more users in the session to provide cause a display of current information from the dataset for the particular session.

15. A method according to claim 12 wherein the plurality of computer implemented functions comprise functions to gather data elements, import data elements, categorize data elements, combine data elements, assign votes to data elements, assign ratings to data elements, prioritize data elements, record tasks in association with data elements and generate a report of the dataset, and wherein the one or more actions comprise rules for manipulating the data elements, each action being configurable within multiple functions.

16. A method according to claim 15 wherein storing the dataset in memory occurs after configuring and activating the function to gather data elements or the function to import data elements.

17. A method according to claim 12 wherein configuring a function, activating a function and performing an action are completed in response to a user command.

18. A method according to claim 17 further comprising receiving a user command to dynamically configure a new function, determining whether the configuration of the new function is permitted within the context for the particular session and if permitted, configuring the new function.

19. A method according to claim 12 further comprising receiving a user command to dynamically activate a configured function in an order different than the configured order of functions, determining whether the activation of the configured function is permitted within the context for the particular session and whether the user has permission to perform the activation of the configured function, and if permitted, activating the configured function.

20. A method according to claim 12 further comprising, after configuring and activating one or more functions, receiving a user command to dynamically configure and activate an additional instance of a particular function for the particular session, wherein the context further comprises an iteration number for each configured function.

21. A method according to claim 12 wherein configuring a function comprises configuring a data element in the dataset for the particular session representing the function.

22. A non-transitory computer readable storage medium in an electronic server device, the medium having stored thereon computer-readable and computer-executable instructions, which, when executed by a processor, cause the electronic server device to perform actions comprising:
receiving commands and user data from one or more client devices;
storing a dataset in memory from the received user data, the dataset comprising one or more data elements;
maintaining a context indicating the dataset and a list of users for a particular session;
in response to received commands,
configuring a plurality of computer implemented functions in any order to modify the dataset, by dynamically adding one or more actions within each function while the function is activated and dynamically configuring one or more actions within each function, including the one or more added actions, to modify the one or more data elements;
activating configured functions in any order to modify one of the datasets;
performing one or more actions of an activated function to modify the dataset; and
prior to configuring one of the plurality of functions, dynamically adding one or more actions within each function, activating a configured function and performing an action, determine whether the configuring, adding, activating or performing is permitted within the context for the particular session and determine whether the user has permission to perform the configuring, adding, activating or performing; and
displaying the modified dataset to one or more users.

23. A non-transitory computer readable storage medium according to claim 22 wherein the functions comprise functions to gather data elements, import data elements, categorize data elements, combine data elements, assign votes to data elements, assign ratings to data elements, prioritize data elements, record tasks in association with data elements and generate a report of data elements of the one or more datasets, and wherein the one or more actions comprise rules for manipulating the data elements, each action being configurable within multiple functions.

* * * * *